United States Patent
Zafiroglu

(10) Patent No.: US 9,243,359 B2
(45) Date of Patent: Jan. 26, 2016

(54) FABRIC-FACED FLOOR COVERINGS WITH MICRO-SPRING FACE STRUCTURES

(75) Inventor: Dimitri Zafiroglu, Centreville, DE (US)

(73) Assignee: DZS, LLC, Midlothian, VA (US)

( * ) Notice: Subject to any disclaimer, the term of this patent is extended or adjusted under 35 U.S.C. 154(b) by 895 days.

(21) Appl. No.: 13/447,863

(22) Filed: Apr. 16, 2012

(65) Prior Publication Data
US 2013/0273297 A1 Oct. 17, 2013

(51) Int. Cl.
*D05C 17/02* (2006.01)
*B32B 7/04* (2006.01)
*B32B 7/12* (2006.01)
(Continued)

(52) U.S. Cl.
CPC ............... *D05C 17/00* (2013.01); *B32B 5/024* (2013.01); *B32B 5/026* (2013.01); *B32B 5/08* (2013.01); *B32B 7/02* (2013.01); *B32B 7/12* (2013.01); *D03D 1/0017* (2013.01); *D03D 15/04* (2013.01); *D03D 27/04* (2013.01); *D04B 21/02* (2013.01); *D04H 11/00* (2013.01); *B32B 2255/02* (2013.01); *B32B 2255/26* (2013.01); *B32B 2262/0253* (2013.01); *B32B 2262/0276* (2013.01); *B32B 2307/51* (2013.01); *B32B 2307/542* (2013.01); *B32B 2307/724* (2013.01); *B32B 2307/7265* (2013.01); *B32B 2471/00* (2013.01); *D10B 2503/04* (2013.01); *Y10T 428/239* (2015.01); *Y10T 428/23986* (2015.04); *Y10T 428/2481* (2015.01); *Y10T 428/2495* (2015.01); *Y10T 428/249921* (2015.04);
(Continued)

(58) Field of Classification Search
CPC ............. B32B 3/02; B32B 5/02; B32B 7/04; B32B 7/12; D03D 27/00; D04B 21/02; D04H 11/00; D04H 11/04; D05C 17/02; Y10T 428/23957; Y10T 428/23964; Y10T 428/23971; Y10T 428/23979; Y10T 428/23986
USPC .................... 428/92, 93, 94, 95, 96
See application file for complete search history.

(56) References Cited

U.S. PATENT DOCUMENTS 3,560,284 A 2/1971 Wisotzky
4,808,459 A 2/1989 Smith
(Continued)

FOREIGN PATENT DOCUMENTS

GB 1180342 A 2/1970

OTHER PUBLICATIONS

International Search Report and Written Opinion issued in connection to corresponding International Application No. PCT/PCT2013/035631 on Aug. 9, 2013.

*Primary Examiner* — Cheryl Juska
(74) *Attorney, Agent, or Firm* — The H.T. Than Law Group

(57) ABSTRACT

The present invention is directed to multiple-layer composites suitable for use as floor-coverings in the form of cut tiles or broadloom sheets, providing a durable and highly stable structure that can lay flat and remain flat with variations in temperature and humidity and provide a durable and yet soft textile face. The composite comprises a laterally-compressible fabric face bonded with an adhesive layer to a highly conformable stress-absorbing cushioning layer. The face fabric comprises closely packed looped yarns reciprocating between the top and the bottom of the fabric, protruding into the adhesive layer and emerging from the adhesive layer to the surface forming micro-spring structures. The weight, properties, density and level of penetration of adhesive are controlled to maintain lateral compressibility for the entire composite and avoid warping.

25 Claims, 15 Drawing Sheets

(51) Int. Cl.
*D05C 17/00* (2006.01)
*B32B 7/02* (2006.01)
*D04B 21/02* (2006.01)
*D04H 11/00* (2006.01)
*D03D 1/00* (2006.01)
*D03D 15/04* (2006.01)
*D03D 27/04* (2006.01)
*B32B 5/02* (2006.01)
*B32B 5/08* (2006.01)

(52) U.S. Cl.
CPC ............ *Y10T428/273* (2015.01); *Y10T 442/40* (2015.04); *Y10T 442/60* (2015.04)

(56) References Cited

U.S. PATENT DOCUMENTS

| | | | |
|---|---|---|---|
| 5,965,232 A * | 10/1999 | Vinod | .............................. 428/85 |
| 6,269,759 B1 | 8/2001 | Zafiroglu | |
| 6,468,623 B1 | 10/2002 | Higgins | |
| 6,936,327 B2 | 8/2005 | Zafiroglu | |
| 7,255,761 B2 | 8/2007 | Zafiroglu | |
| 7,338,698 B1 | 3/2008 | Bieser | |
| 7,425,359 B2 * | 9/2008 | Zafiroglu | .................. B32B 3/28 428/131 |
| 7,431,975 B2 * | 10/2008 | Zafiroglu | .................. B32B 3/28 156/297 |
| 7,622,408 B2 | 11/2009 | Zafiroglu | |
| 8,216,659 B2 * | 7/2012 | Zafiroglu | .............. B29C 43/222 428/131 |
| 2004/0106345 A1 * | 6/2004 | Zafiroglu | .................. B32B 3/28 442/149 |
| 2004/0106346 A1 * | 6/2004 | Zafiroglu | .................. B32B 3/28 442/149 |
| 2009/0047465 A1 | 2/2009 | Zafiroglu | |
| 2010/0279057 A1 | 11/2010 | Zafiroglu | |

* cited by examiner

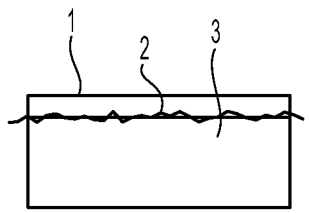
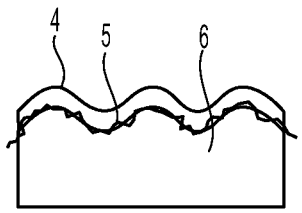
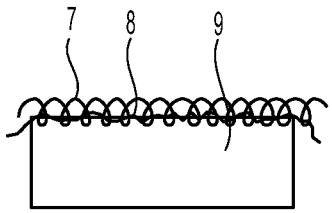
*Fig. 2A*
*Prior Art*
Flat Face
Group A
*Fig. 2B*
*Prior Art*
Undulated Face
Group E
*Fig. 2C*
Invention
Microspring Flat Face
Group E
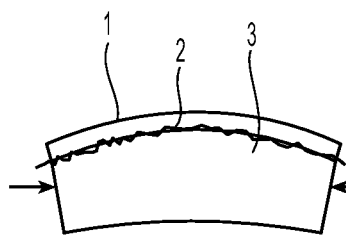
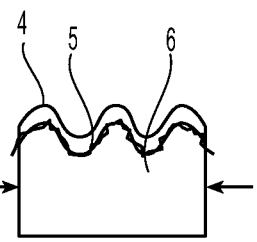
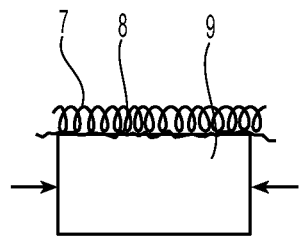
*Fig. 2A′*
*Prior Art*
Flat Face
Compressed
*Fig. 2B′*
*Prior Art*
Undulated Face
Compressed
*Fig. 2C′*
Invention
Microspring Flat Face
Compressed
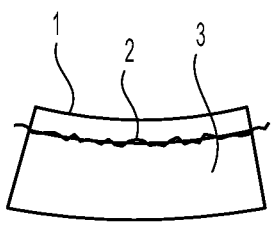
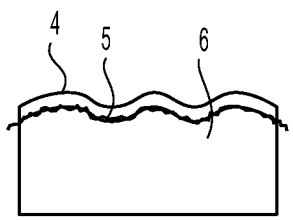
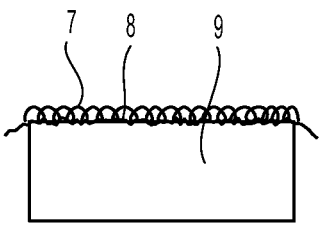
*Fig. 2A″*
*Fig. 2B″*
*Fig. 2C″*

$$X = \sqrt{L^2 + C^2}$$

$$x_1 < \tfrac{x}{2} \qquad x_2 \lesssim \tfrac{1}{2}\sqrt{L^2 + X^2}$$

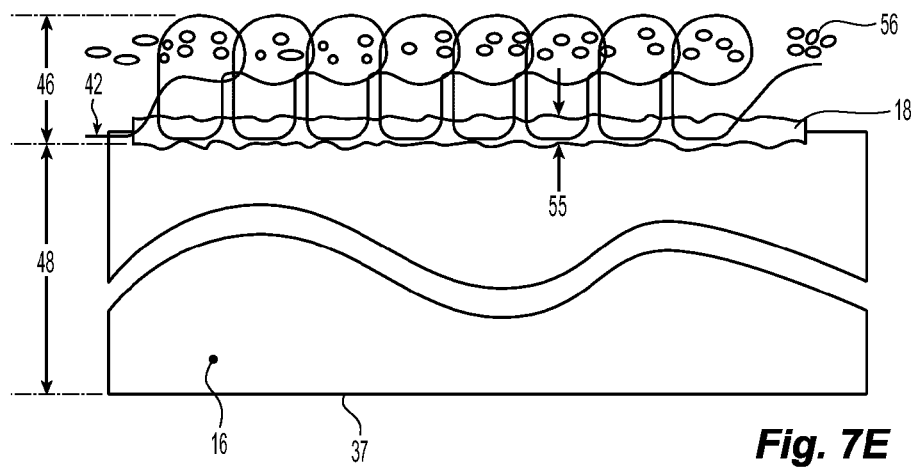
*Fig. 7E*
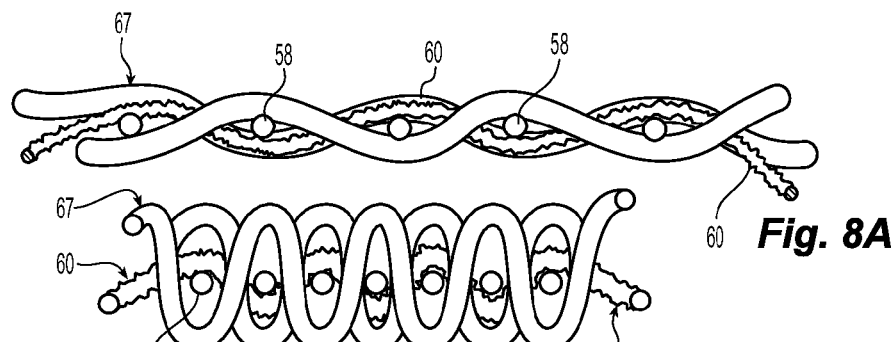
*Fig. 8A*
*Fig. 8B*
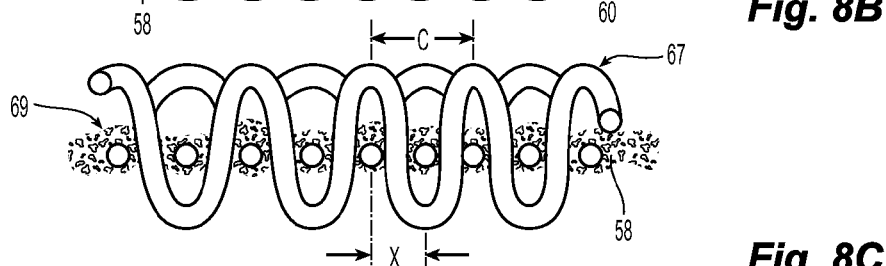
*Fig. 8C*
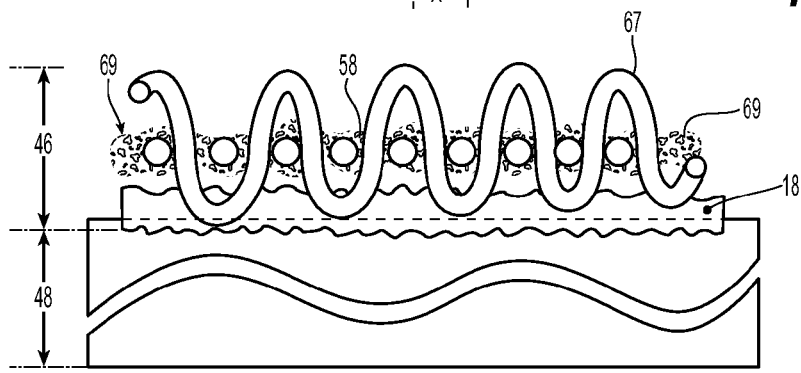
*Fig. 8D*

FABRIC-FACED FLOOR COVERINGS WITH MICRO-SPRING FACE STRUCTURES

FIELD OF THE INVENTION

The present invention relates to fabric-faced laminates, suitable as floor coverings and especially modular floor coverings such as carpet tiles, in applications involving significant floor wear.

BACKGROUND OF THE INVENTION

The selection of a floor covering is generally based upon a combination of factors including aesthetic features, such as the look and feel of the floor covering, and functional features, such as retention of surface appearance, stain resistance, moisture resistance, ease of cleaning, and resistance to dirt build-up. For example, floor covering installations prone to high traffic, dust and dirt collection, or to moisture or stains, such as in kitchens, generally use solid materials such as wood, metals, ceramic tile, vinyl or rubber. These products retain their surface appearance after heavy use, are simple to keep clean, and are less prone to harboring bacterial growth. Moreover, they are suitable for modular or tile installations, because they are relatively stiff, and, most preferably, dimensionally stable. These attributes permit the floor coverings to be evenly secured to the floor, and to lay flat and remain flat during use as temperature and humidity vary with time, a property known as "lay-flat". However, these products lack the textile look, softness or sound dampening qualities of textile products.

FIG. 1 prepared by the present inventor graphically and schematically summarizes floor covering technology offering cushion, softness and sound dampening along with a fibrous/textile surface. Durability varies and it is not plotted. Products are grouped by two factors: planar gather and face stretch. The grouping is for illustrative purposes only, indicating the direction of property change. Properties are not plotted to scale. Group A in the center includes the most common types of textile-faced floor coverings. They generally lack the superior stability of the solid floorcoverings because they are, in general, built with layers of organic or polymeric materials and, as the layers expand or contract at different rates with temperature or humidity, the composites tend to deform out of plane. They also allow very limited gather, i.e. limited planar contraction, and limited surface stretch. For these types of textile structures the capability to gather planarly is desirable, because it would allow the structure to accommodate lateral stresses created when the composite tries to expand while confined between walls or tiles on the floor, and minimize the tendency to buckle or warp out-of-plane. Low face stretch is also desirable so that the floorcovering does not develop resistance to forward foot, furniture or cart motion, and/or it does not delaminate due to repeated face stretch with traffic. Floor coverings in Group A include conventional carpets with relatively deep cushioning piles prepared by tufting, knitting, stitchbonding, knotting or weaving, as well as laminates of thin textile fabrics bonded to cushioning backings.

Group B, placed in the upper left hand group of FIG. 1 emulates the solid, stable floorcoverings. In general it includes floorcoverings similar to those in Group A with added reinforcement, using stiff and/or heavy sub-layers and/or extra adhesive, to stabilize the structure and essentially eliminate both surface stretch and gather.

Group C, placed in the lower right-hand group, is an attempt in the opposite direction, wherein a floorcovering is composed of a highly-elastic textile face layer attached to an elastic cushion allowing high gather as well as high stretch. Such a floorcovering is undesirable in high-wear commercial, institutional or other such applications, because traffic is impeded by the stretchy surface and repeated stretch can cause delamination with heavy use. Group C floorcoverings may be too elastic to resist foot traffic.

Group D represents textile-faced floorcoverings with high face layer stretch and virtually no gather. Such floorcoverings are undesirable, because they would be too elastic/stretchy to walk on and would also buckle out-of-plane due to low gathering. No products of this nature have been developed in prior art.

Group E goes in the opposite direction and includes preferred textile-faced floor coverings that are both easy to walk on, i.e., have low face layer stretch, and would not buckle out-of-plane because they have the ability to contract and expand, i.e., high gather. The group includes laminates by the present inventor having planarly-gatherable undulating thin fabric faces joined to compliant cushioning backings.

The traditional deep cushioning-pile products within Group A of FIG. 1 include tufted, knitted, stitched, knotted, or woven pile structures. They provide softness, cushion, and a limited level of abrasion and wear resistance. Compared to rigid solid-surfaced products they are less durable. Deep cushioning-pile products also tend to lose their texture and their cushion with heavy use. This occurs because their piles become "matted", as they are bent and crushed with heavy traffic. Denser and shorter piles may increase the durability of these products at the expense of cushion. Many deep-pile structures are also generally prone to unraveling at cut edges, requiring heavy fortification in modular or tile applications. Additionally the spaces between the upstanding piles tend to collect dust and dirt, allowing the growth of bacteria, making the floor-covering difficult to clean and sanitize. To stay flat, most broadloom carpets of this type are stretched and held at the edges of the room with pin-plates, Velcro™, and/or other similar means in order to hold the pre-stretched carpeting. If the product is used as a modular tile, deep cushioning pile structures are reinforced with heavy and stiff backings or with added stiff yarns, as exemplified by Justesen U.S. Pat. No. 5,902,663, Irwin U.S. Pat. No. 5,962,101, and Schilling U.S. Pat. No. 6,162,748, as shown in Group B in FIG. 1. The added backings dominate the thermal and hygroscopic characteristics of the composite in order to help the composite remain flat on the floor despite changes in temperature and/or humidity.

The remainder of the floorcoverings shown in Group A in FIG. 1 include relatively thin textile fabrics laminated to soft and thick resilient backings. They provide dirt-blocking and textile face aesthetics along with cushion. For the sake of durability and abrasion resistance the face fabric is a "velours", velvet or similar structure with the face fibers upstanding or looping at the surface. The upstanding or looping fibers are held in place or "anchored" with fibrous or polymeric "base" or "anchoring" sublayers that stabilize the fabric, but increase the tendency of the denser face layer to expand and contract much faster than the softer cushion as temperature and humidity varies. Consequently the thermal and hygroscopic properties of the relatively dense face layers are not balanced against the thermal and hygroscopic properties of the bulky cushioning backings. Small amounts of differential expansion or contraction can cause major warping, with the edges and corners rising over the center (cupping), or the center rising over the edges and corners (doming). Differential expansion or contraction of the floor covering as low as 1% can cause dramatic warping by a height approximately equal to 10% of the length or width of the floor covering. Composite floorcoverings using shallow-pile face fabrics containing dense anchoring base sublayers are disclosed in U.S. Pat. No. 3,066,513 to Leybourne, U.S. Pat. No. 3,576,701 to Salamon, and U.S. Pat. No. 7,622,408 to Zafiroglu, among others, as shown in FIG. 1. Similar fabrics, not necessarily intended for floorcovering composites, are also disclosed in U.S. Pat. No. 529,858, to Hardwick, U.S. Pat. No. 3,254,510 to Lesley, U.S. Pat. No. 4,284,507 to Beane, U.S. Pat. No. 4,406,309 to Czelusnik, and U.S. Pat. No. 3,732,708 to Troy.

U.S. Pat. Nos. 6,936,327 and 7,255,761 to Zafiroglu, the present inventor, are also listed in Group A in FIG. 1, and incorporated by reference herein in their entirety. They disclose stitchbonded fabrics using shrinkable substrates designed to cause the stitching yarns to buckle out of plane and form pile-like loops. The shrunk substrates remain within the fabric structure, stabilize the fabric and hold the buckled yarns in position, serving the same function as the fibrous anchoring base sub-layers of the shallow-pile fabrics discussed above. The shrunk fabrics may be attached as they are to a soft cushion layer without additional processing steps to form floor-coverings. The lay-flat properties of such floor-coverings are not discussed.

Another U.S. Pat. No. 3,985,925 to Lefebvre, also shown in Group A in FIG. 1, envisions a mechanism similar to fabric stabilization for the sake of durability. Very light woven or knit face "velvet" face fabrics weighing only between 70 and 120 g/m$^2$ are attached to dense sublayers, in the range of 1,000-1,200 kg/m$^3$ (1.0-1.2 g/cc), which are in turn attached to or co-formed with less and less dense secondary cushioning sublayers. Details of the construction of the fabrics or the expected level of durability are not discussed, and no provision is made for layflat. A dense sublayer directly glued to a very light fabric having a very limited weight of "pile" fibers would severely limit facial aesthetics, and have quite limited abrasion resistance. It would also dominate expansion and contraction and make it difficult to control layflat.

Other approaches have been proposed in prior art dealing with thin face fabrics attached to soft cushion layers; U.S. Pat. No. 2,688,578 to Teague shown as part of Group C in FIG. 1 goes in the opposite direction and proposes a durable floor covering prepared by laminating a relatively thin and highly-stretchable elastic face fabric to an elastic backing with highly-elastic adhesives. Preferred elastic face fabrics include inelastic fabrics coated or impregnated with elastic polymers. The face is required to stretch by at least 15% and preferably up to 50% to simulate the lateral deflection of the upstanding pile yarns of deep-pile floor coverings. However, unlike the action of deep pile tufts which can bend forward without impeding forward foot or roller or caster motion, a highly elastic face can increase drag against traffic, and in instances of high traffic it can result in excessive surface fiber fatigue and delamination due to repetitive stretching. A highly deformable elastic face can particularly increase resistance to sliding chairs across the floor, which is already a problem with the majority of pile carpeting. Walking on a highly stretchable face fabric is difficult due to the unstable nature of the highly stretchable surface. Moreover the construction of the face fabrics, the orientation of the surface fibers, the level of fibrous surface quality after the application of adhesive, or the targeted level of durability are not disclosed, and no provision is made for lay-flat.

As shown in Group E of FIG. 1, a different concept for simultaneously improving the dimensional stability, lay-flat, and durability for floor-coverings using textile fabrics attached to cushioning layers, without adding stiff underlayers under the textile face, is disclosed in U.S. Pat. Nos. 7,425,359 and 7,431,975 to Zafiroglu, the present inventor, and are incorporated herein in their entirety. They utilize deeply-structured three-dimensional undulated surfaces, automatically accommodating planar stress by acting as planarly-extensible and compressible spring-like layers, and by distributing surface expansion and contraction along the facial undulations, and virtually eliminating deformation out-of-plane. U.S. published patent application US 2009/0047465, also by the present inventor and hereby incorporated by reference in its entirety, extends the concept to more durable embodiments by requiring substantially continuous adhesion, along the undulations. The undulating surface approach, however, limits the possibility of a floor-covering with a smooth-surface, which is desirable in some instances for further processing, e.g., printing, floor-performance, easier cleaning, or aesthetics. It also limits surface textures to those that are laterally compressible, but not necessarily aesthetically desirable

SUMMARY OF THE INVENTION

The present invention is a textile faced floor covering that also occupies the most optimal area E of FIG. 1, i.e., high gathering ability to lay flat and low face layer stretch for facial stability. The face layer of the present invention comprises yarns forming spring-like coils or loops that are significantly smaller in scale than the undulated face layers of the other references that occupy area E of FIG. 1. Whilst the prior art structures of area E of FIG. 1 are capable to gather as the face undulations are able to planarly compress accordion-like with negligible resistance from the pliant cushion layers underneath, the inventive looping or coiling face yarns are able to planarly compress or gather as they are held by porous and conformable adhesive, without the substantial resistance of secondary reinforcing base layers.

The difference between the prior art in Group A, and Group E, and the difference between the prior art of Group E and the Invention within Group E are illustrated in FIG. 2. Gather in response to thermal and hygroscopic changes is described in two situations:

(a) If the composite floorcovering is confined within a defined planar space, and the temperature rises and or the humidity changes in the direction of making the composite expand, a composite within Group A of FIG. 1 illustrated in FIG. 2A will tend to buckle upward as shown in FIG. 2A', because it would be impeded by the stabilizing/anchoring base layers within the face fabric, and could not absorb the resultant compression by gathering within its own plane.

(b) If the floorcovering is subjected to lower temperatures or conditions that tend to make the face structure consisting of face fabric 1 and adhesive layer 2 contract, this contraction is likely to be greater than the contraction of the more porous and softer cushion backing 3, and a composite shown in FIG. 2A will tend to "cup" or curl" as shown in FIG. 2A".

The undulated face structure of a prior art composite within Group E combining face fabric 4 adhesive 5 and cushion backing 6, will allow all layers to expand or contract simultaneously, and the composite to remain flat, as shown in the sequence of FIGS. 2B, 2B', and 2B". In a similar manner the looped or coiled face layer 7 attached to soft cushion 9 with porous adhesive 8 of the present invention, unimpeded by stabilizing/anchoring base sublayers, will also contract or expand along with the rest of the structure, and continue to lay flat as shown in the sequence of FIGS. 2C, 2C' and 2C".

In the present invention the stretch of the face layer attached to the backing is also limited to provide stability and avoid resistance to traffic. The inventive floor covering also has a compliant backing designed to absorb the forces and pressures generated by traffic and by the variation of temperature and humidity.

DESCRIPTION OF THE DRAWINGS

In the accompanying drawings, which form a part of the specification and are to be read in conjunction therewith, like reference numerals are used to indicate like parts in the various views:

FIGS. 2A, 2A', 2A", 2B, 2B', 2B", 2C, 2C' and 2C" summarize the main characteristics of flat and coarser-scale textile composites of prior art versus the finer-scale composites of the present invention.

FIGS. 7A-7E illustrate cross sectional views of composites using a warp-knit pile fabric containing a shrinkable sublayer that can be rendered discontinuous prior to or during lamination to a cushion layer.

FIGS. 8A to 8D illustrate another embodiment of the floor covering of the current invention which incorporates a woven fabric with shrinkable weft yarns that can be rendered discontinuous prior to or during lamination to a cushion layer.

DETAILED DESCRIPTION OF THE INVENTION

Parts List

Figure 1:
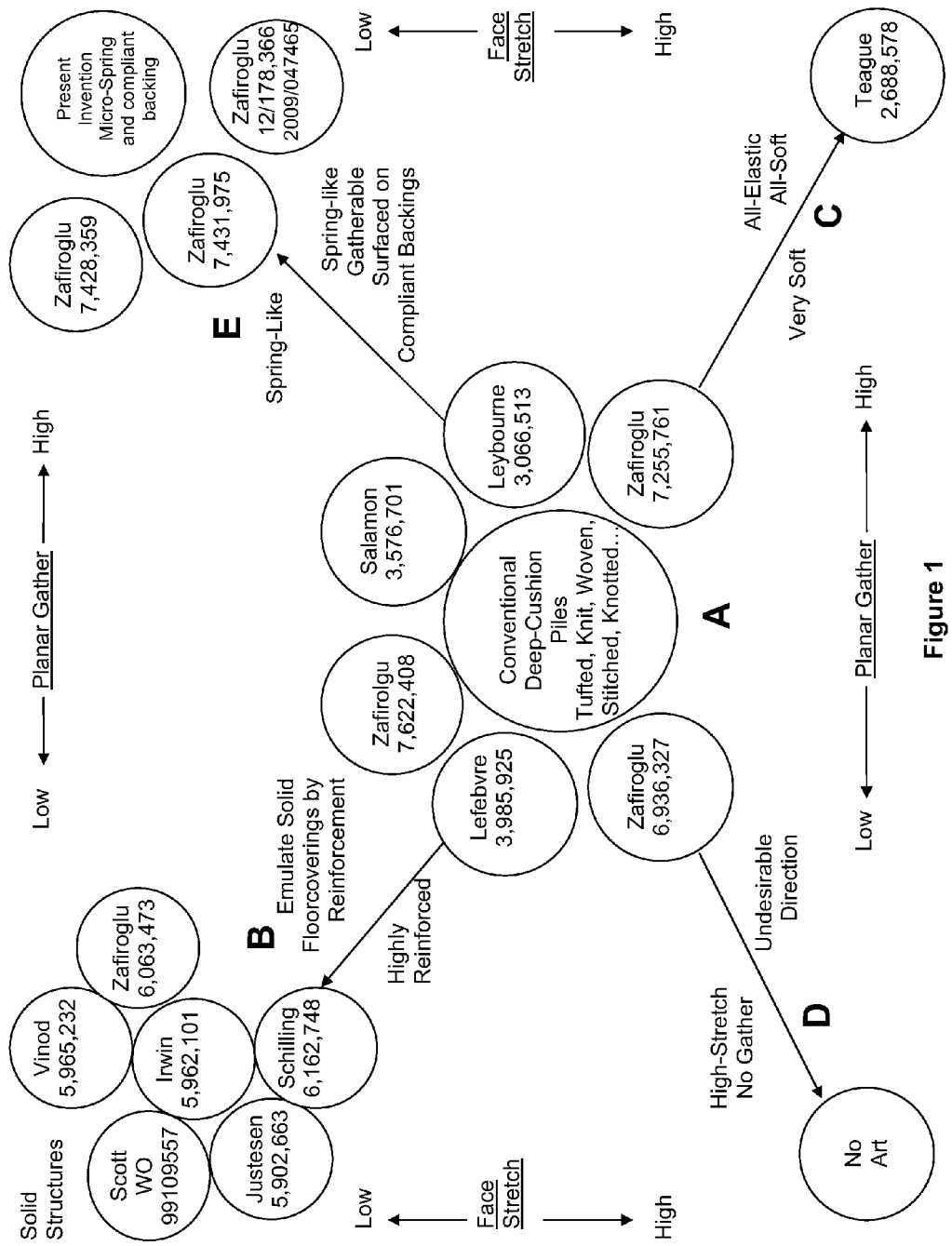
FIG. 1 summarizes the types or groups of textile-faced floorcovering in terms of planar compressibility or face gather and face stretch.

1. Face fabric of conventional flat composite
2. Adhesive of conventional flat composite
3. Cushion backing of conventional flat composite
4. Face fabric of conventional composite with undulated face
5. Adhesive of conventional composite with undulated face
6. Cushion backing of conventional composite with undulated face
7. Face fabric of present invention
8. Adhesive of present invention
9. Cushion backing of present invention
10. Composite floor covering
12. Total thickness of 10
14. Fabric face layer
16. Cushioning layer or cushion layer or backing
18. Adhesive composite layer extending into face and cushioning layer
22. Top surface of face layer
24. Bottom surface of face layer within adhesive
25. Thickness of portion of face layer above adhesive
26. Total initial thickness of face layer
28. Weft-knit yarn course
30. Weft-knit yarn course following course 28
32. Peak loop
34. Trough loop
36. Top surface of cushion 16
37. Bottom surface of cushion 16 and composite
38. Spaces under the apexes of loops 32
39. Spaces under the apexes of loops 34
41. Level of adhesive penetration into fabric face layer 14
42. Level of adhesive penetration into cushion 16
44. Bottom of surface layer in contact with cushion layer within adhesive
46. Thickness of "surface structure", from surface 22 to level 42
48. Thickness of "cushioning structure" level 42 to level 37
50. Underlap of warp knit fabric
52. Overlap of warp knit fabric
54. Shrinkable sub-layer within a warp-knit face fabric
56. Loose, discontinuous version of 54
58. Woven warp yarn
60. Woven shrinkable weft yarn
62. Stitchbonded yarn
63. Stitchbonded yarn overlap
64. Shrinkable/decomposable layer in stitchbonded fabric
66. Layer 64 decomposed by heating under constraint
67. Non-shrinkable woven weft yarn
69. Discontinuous version of woven shrinkable woven weft yarn 60
70. Circular cut sample of composite 10
72. Test ring for planar compression test
73. Tufted pile yarn
74. Shrinkable/decomposable tufting backing
76. Backing 74 decomposed by restrained heating
77. Tufted backlaps
79. Pin plate for shear test
80. Pin plate for shear test
84. Shrinkable/decomposable backing for intermittently bonded fabric
86. Discontinuous version of backing 84
88. Intermittently bonded face yarn
102. Conventional pile fabric base layer
104. Conventional pile fabric pile yarn
106. Another conventional pile fabric yarn
116. Conventional cushion backing
118. Barrier layer
119. Adhesive layer under barrier layer
  A. Approximate angle of yarn descent from peak loop to trough loop
  C. Transverse spacing of repeated loops
  CU. Rise at curled edge L. Longitudinal spacing of repeated loops
R. Point of yarn entrance into adhesive
X. Lateral/planar distance from peak of exposed loop to entrance into adhesive
W Warp-knit or stitch-bonded wale
   a, b, c d, etc. . . . markers every 1 cm from edge on face in test of FIG. 11.

The composites of the current invention provide highly durable and dimensionally-stable textile floor coverings without the use of stiff reinforcing layers, face resins, or deep surface texturing, and are suitable for applications requiring high durability and stability, particularly as modular/tile floor coverings.

As pointed out above, FIGS. 2A-2C illustrate the differences between prior art and the current invention. Flat face layer 1 of prior art in FIG. 2A is attached with adhesive 2 to compliant cushion layer 3, and it is likely to buckle or warp under planar compression caused by confinement, as shown in FIG. 2A', since the upper structure contains planar elements that can resist planar contraction. It can also warp as the denser upper layers contract more than the more porous lower layers, as shown in FIG. 2A". When the same face structure composed of face layer 4 and adhesive 5 is undulating as shown in FIG. 2B stresses and strains are distributed along the undulations and absorbed by the compliant backing 6 in an undulating form capable of contracting or expanding in a manner similar to an accordion. In this configuration, face layer 4 and/or adhesive layer 5 can have significantly higher densities compared to cushion layer 6 without creating problems, provided that cushion layer 6 is highly compliant and does not impede planar expansion or contraction along the top surface, as shown in FIGS. 2B' and 2B".

Using a similar general concept in a novel manner, the composite of the current invention shown in FIG. 2C utilizes face layer 7 composed of fibers reciprocating from the top surface of the face layer to the bottom surface by looping or coiling with a high frequency, and forming generally upstanding closely-spaced loops, coils or micro-springs of a much smaller scale, held in place by porous/compliant adhesive layer 8 onto compliant cushion layer 9. Preferably, additional elements within the face fabric, if any (not shown), are also configured so that they do not impede the freedom of the face layer to gather within its own plane. Consequently, all layers can accommodate stresses simultaneously and the composite can stay flat as depicted in FIGS. 2C' and 2C". With or without compliant internal secondary sublayers, face layer 7 may be a very simple, loose and extremely non-durable common fabric, suitable for apparel, medical or other similar light-duty uses, deemed unsuitable for floorcovering use and extremely unstable and deformable prior to lamination. After lamination to the backing it exhibits surprisingly high durability and surface stability.

Figure 3:
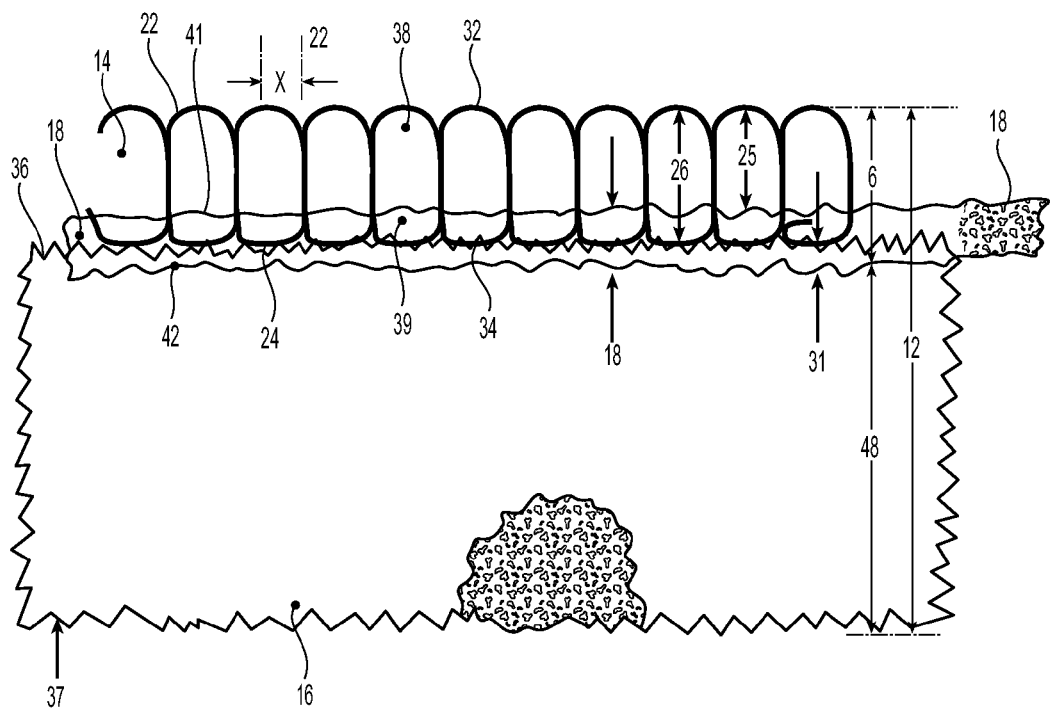
FIG. 3 illustrates the main characteristics of the floorcoverings of the present invention in more detail.

A generalized embodiment of the composite floor covering of this invention is diagrammatically illustrated in FIG. 3 in more detail. Composite 10 is formed with face fabric 14 (which is analogous to layer 7 in FIG. 2C), attached to a porous cushioning backing 16 (which is analogous to layer 9 in FIG. 2C) with adhesive (which is analogous to layer 8 in FIG. 2C) which extends partially into face fabric 14 and backing 16 forming sublayer 18. Each sublayer and the entire composite are configured to minimize thermal and hygroscopic expansion and contraction, and to maximize capability to absorb internal differential stress and external planar and vertical forces. Preferably, sublayer 25 above adhesive, sublayer 18 where adhesive is present, and sublayer 48 below adhesive are fibrous or cellular with a porosity or void fraction averaging above 15% more preferably above 20%. Also preferably, the cellular or fibrous microstructures of each and all sublayers are substantially three-dimensional, with fibers or cell walls oriented in all directions, and therefore capable of absorbing planar stresses by distributing them along the slanted fibers and/or cell walls.

Face layer fabric 14 is formed with reciprocating yarns defining its upper surface 22 with a high frequency of peak loops 32, and its lower surface 24 with a high frequency of corresponding through loops 34. Spaces 38 and 39 under the apexes of the peak and trough loops are free of stiff and planar base sub-layers or anchoring/reinforcing sub-layers which are common and necessary in the self-standing pile fabrics of prior art. The entire face fabric 14 is laterally flexible and equivalent to a planar micro-spring. The entire composite is planarly compressible by at least 1%, more commonly up to 5%. Consequently the face fabric is capable of absorbing lateral stresses caused by thermal or hygroscopic variations, and stresses that may be caused by the shifting of the surfaces of adjacent tiles due to traffic. Support structure 48, consisting of the lower portion of cushioning backing 46 below adhesive, is substantially softer and deeper than the upper face structure 46. The upper face structure 46 consists of layer 18 occupied by adhesive, and the upper part 25 of face fabric 14 above adhesive. Upper face 22 of the composite is sufficiently stable to stretch substantially less than 10%, preferably less than 5%, if forced by traffic or other forces to shift laterally by as much as thickness 12 of the whole composite. Most preferably it stretches by a negligible amount.

Thickness 26 of face layer 14 is generally uniform, but it can also optionally vary for aesthetic reasons within the limitations required by this invention. Thickness 26 can range between 0.5 mm and 3.0 mm, and preferably between 1.0 mm and 2.0 mm. The weight of fabric face layer 14 is above 200 g/m$^2$ and up to about 600 g/m$^2$ (5.8 to 17.7 oz/yd$^2$), and preferably from about 250 to about 400 g/m$^2$ (7.4 to 11.8 oz/yd$^2$). The weight of the composite is generally between 500 and 2,500 g/m$^2$ (15 to 75 oz/sq yd).

According to one aspect of the present invention, the fabrics of face layer 14 do not need to be particularly stable or durable before affixing to a cushioning backing in the manner of this invention. However, once affixed they exhibit surprisingly high durability, resilience, and ability to expand or contract without buckling out of plane. In some embodiments, the yarns forming the two faces of the fabric follow a simple and direct reciprocating path. In other embodiments the path may be more complex, with multiple twists or turns. Irrespective of construction the horizontal, planar distance X within which the yarns enter the adhesive-containing layer 18 as they travel from a peak loop towards a trough loop is kept smaller than fabric thickness 25 above adhesive. As explained below, distance X is determined differently for different fabric constructions, and it is also dependent upon the face of the fabric chosen to be placed against the adhesive. In general, for constructions wherein the peak loops are formed along parallel longitudinal lines, distance X is approximately one half of the spacing L between repeating courses, or repeated wefts, or repeated bond-lines. Distance L is the inverse of "CPI" (courses per unit length), or the inverse of longitudinal stitch density or tuft or bond density. In constructions wherein the peak loops are formed along parallel lines in the cross direction, distance X is approximately one half of distance C between parallel warps or wales. Distance C is the inverse of "Gage", or the inverse of warp or wale density. In constructions wherein the peak loops are formed in a diagonal direction, distance X is determined in accordance to each construction as explained below. Maintaining distance X smaller than thickness 25 ensures that the loops are upstanding with a large angle from the plane of the fabric (closer to vertical, or "fiber-on-end", rather than horizontal or "fiber-on-side").

Figure 4A:
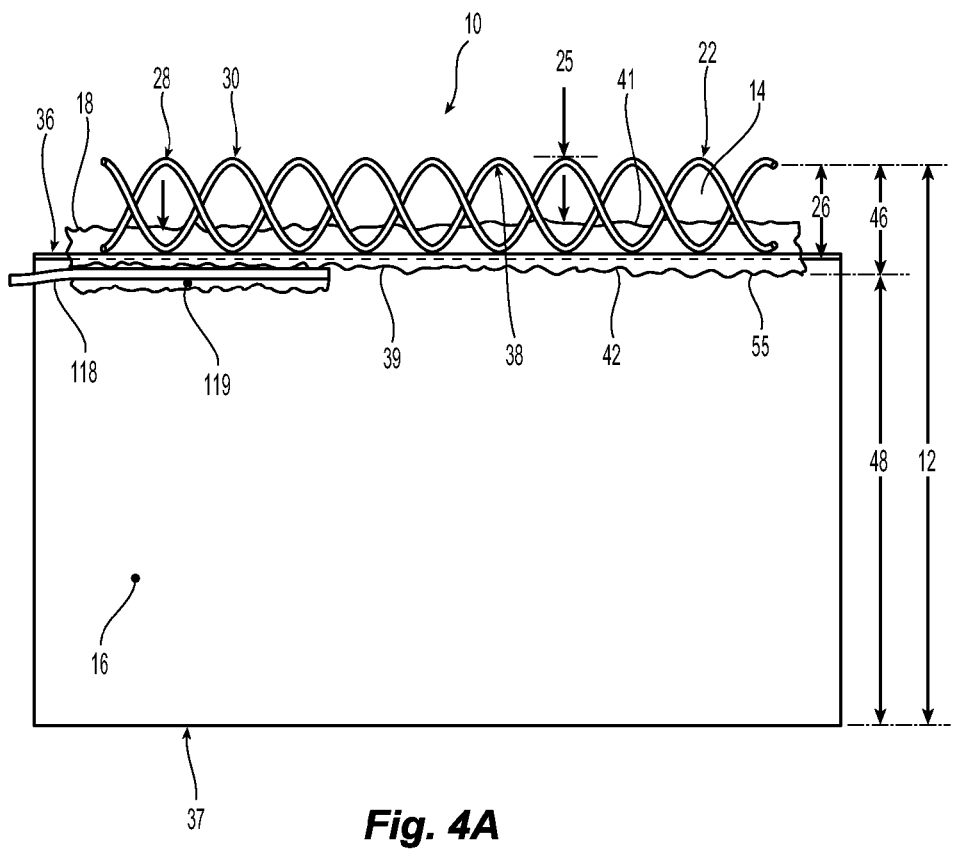
FIG. 4A illustrates an embodiment of the current invention in which the fabric face layer is a weft-knit or circular-knit fabric.
Figure 4B:
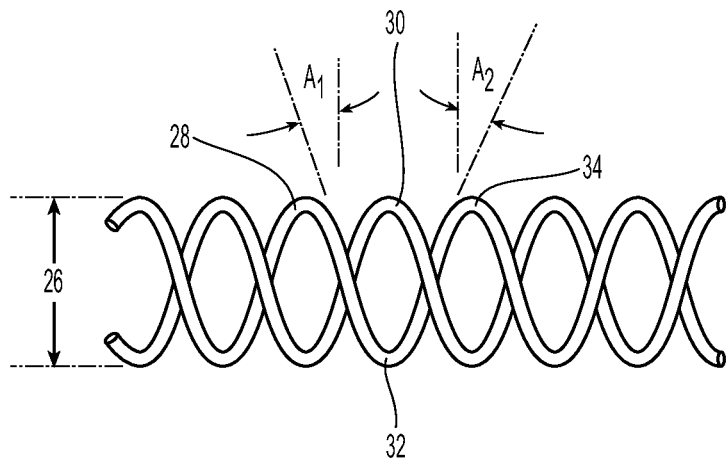
FIG. 4B is a close-up cross section of the upper face layers of the floor covering, and FIG. 4C a diagrammatic top view.
Figure 4C:
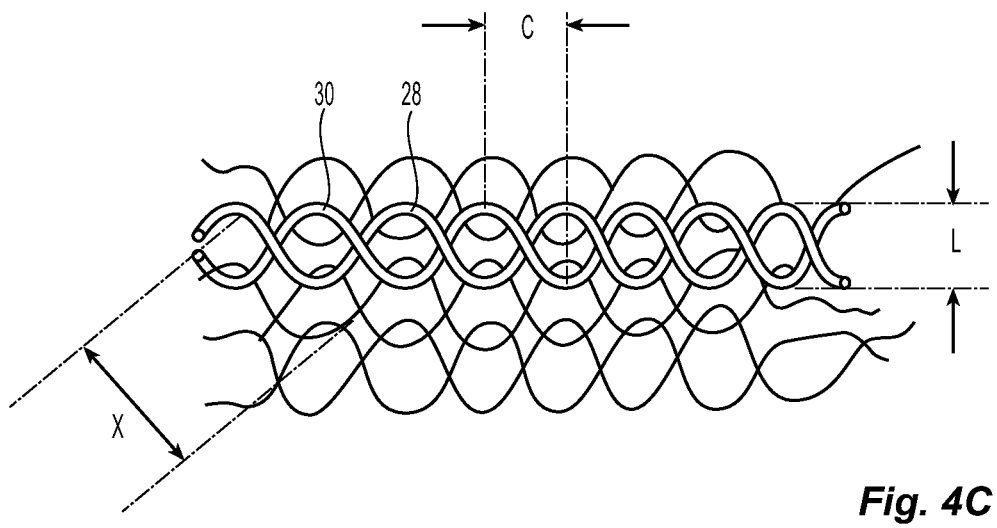

FIGS. 4A-4C, illustrate one particular embodiment wherein the face fabric is a simple weft knit, with consecutive yarn courses 28 and 30 forming peak loops 32 and trough loops 34. Starting at the left hand side of FIG. 4B, surface-forming yarn course 28 descends with angle "$A_1$" from the horizontal plane towards bottom surface 24, and loops at bottom surface 24 forming trough loop 34, ascends with angle "A" to top surface 22, forming a peak loop 32 and descends again. Yarn courses 28 and 30 may originate from the same yarn package or from separate packages. Yarn 30 follows a reciprocating path 180° out of phase with the path of yarn 28. FIG. 4C shows a diagrammatic top view of the fabric with yarn courses 28 and 30, and previous and subsequent yarn courses providing planar continuity. Distances L and C are shown in FIG. 4C. In this configuration dimension X is slightly smaller than the square root of the sum of the squares of dimensions L and C. FIGS. 4A-4C also show that in this embodiment of the invention the yarns forming the two surfaces wrap around each other as they traverse from a trough loop to a peak loop and on to the next trough loop. It is believed that this type of inter-engagement improves the durability of the floor covering.

Figure 5A:
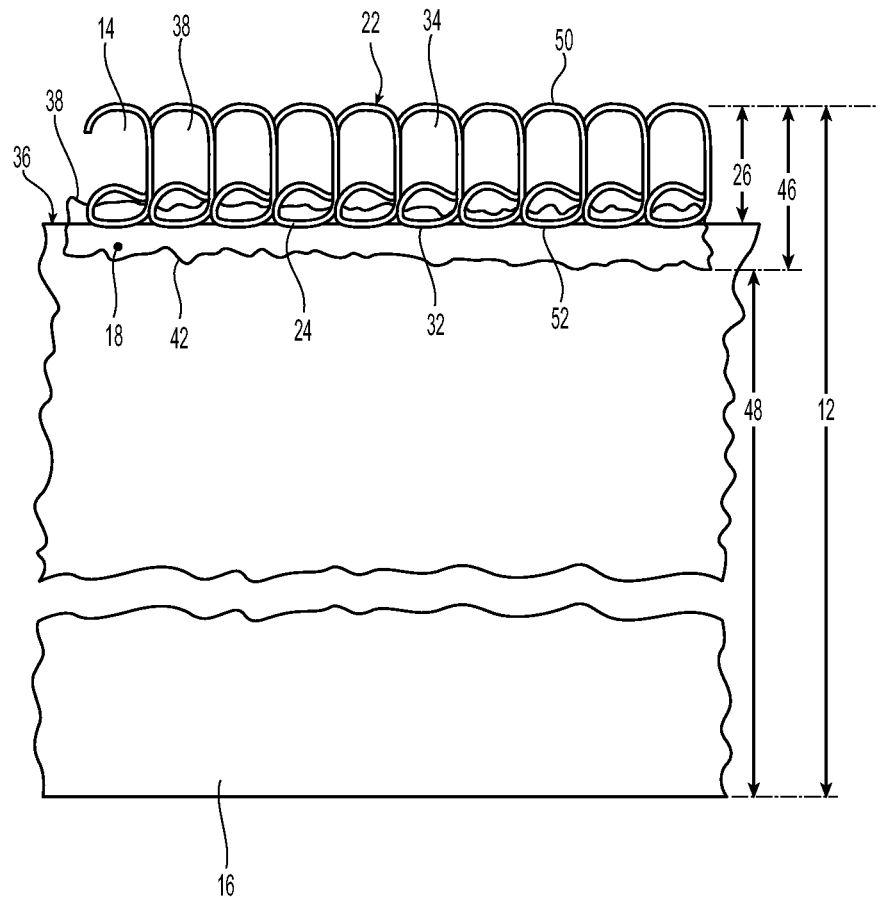
FIG. 5A illustrates an embodiment of the current invention in which the fabric face layer is a warp-knit tricot fabric.
Figure 5B:
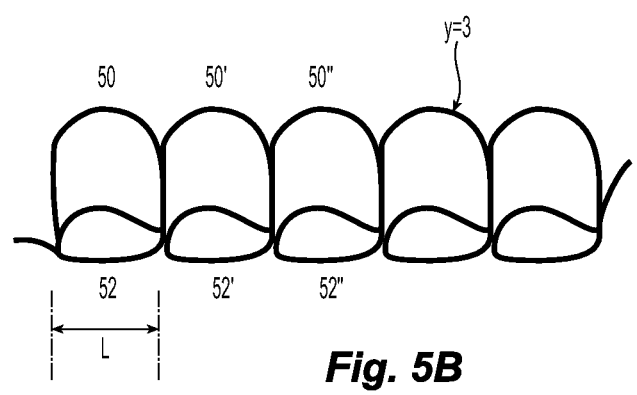
FIG. 5B is a close-up of the cross section of the face fabric.
Figure 5C:
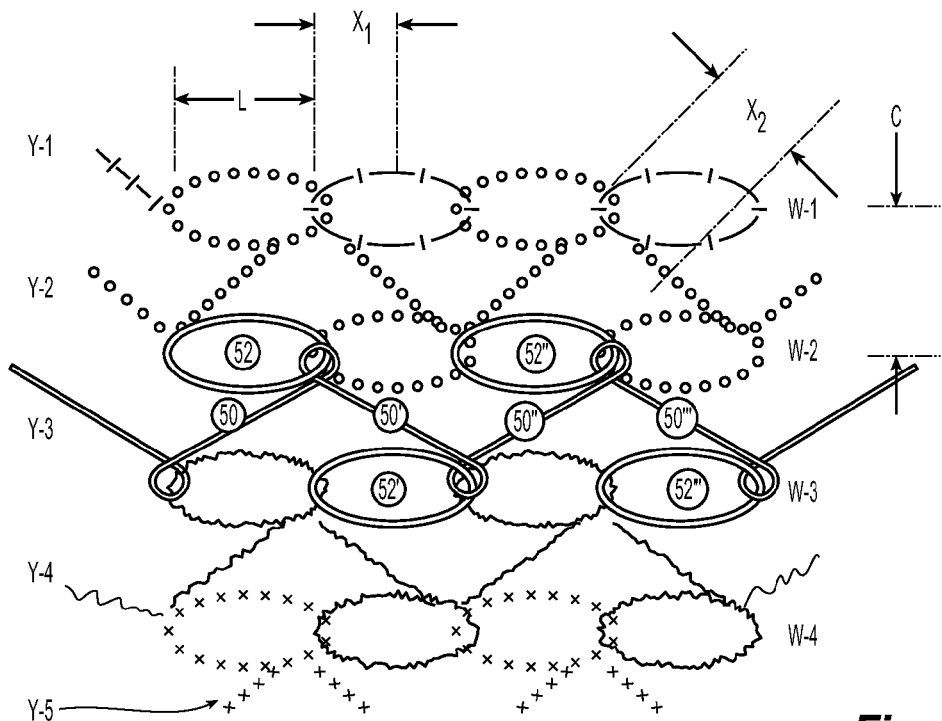
FIG. 5C is a diagrammatic top view of the stitch pattern.

In another embodiment using a simple 1-0/1-2 warp-knit tricot fabric, diagrammatically illustrated with FIGS. 5A and 5B, the loops are more complex and circuitous. The fabric is devoid of the customary stabilizing/anchoring "base layer" of the "pile fabrics" of prior art. FIG. 5C shows a diagrammatic top view of the face fabric. The yarns are "knitted-in". Columns or wales W of individual surface forming yarns engage adjacent columns or wales in a tricot fashion. The approximate locations of the apexes of the surface loops are marked with small circles. Exemplary yarn Y3, shown solid in FIG. 5C, starts at underlap 50, reverses at point R and forms a loop with overlap 52 along wale W-1, then proceeds diagonally through reversal points R' to adjacent wale W-2 as it forms a peak loop with underlap 50', then forms overlap 52' along wale W-2, and repeats. Adjacent warp yarns Y-2 and Y-4 fill-in at intermittent spaces as shown. In this manner all yarns are inter-engaged and virtually "knotted" with full wraps around each other. Dimensions L and C are shown in FIG. 5B. With the fabric placed over the adhesive with the underlaps up, as shown in FIG. 5A dimension X is approximately equal to the planar distance traveled by the yarns from the peak of under-laps 50, 50' etc to the reversal points, or slightly smaller than one half of the square root of L-squared plus C-squared. As noted above, dimension L is the inverse of CPI and dimension C is the inverse of Gage.

Figure 5D:
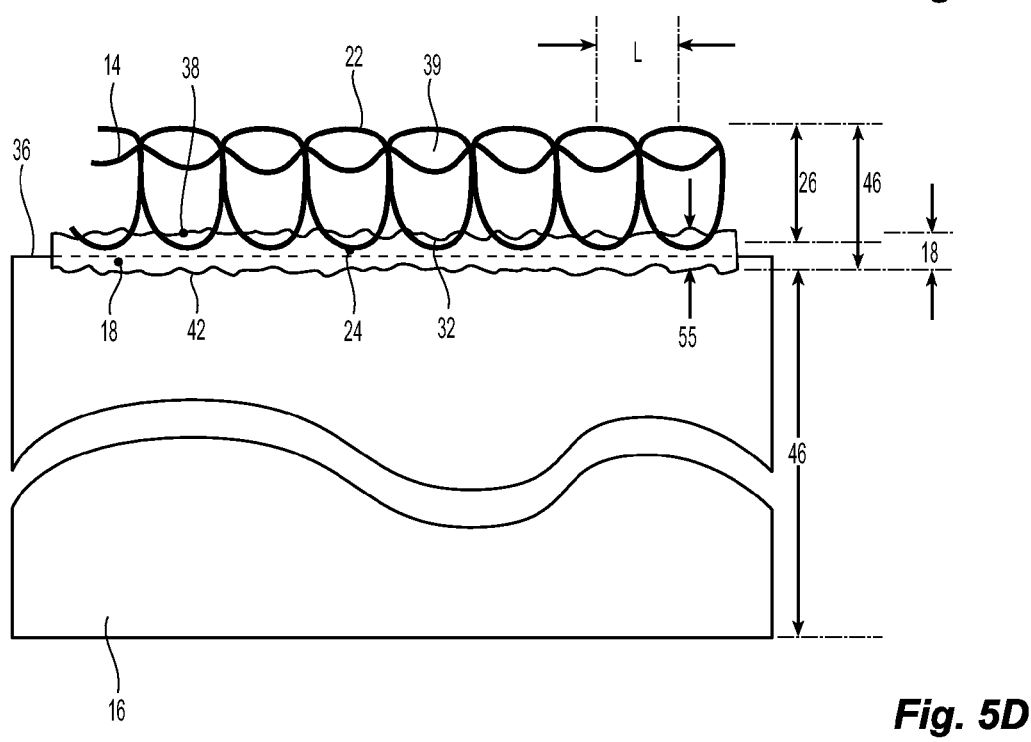
FIG. 5D shows an alternate arrangement with the fabric reversed against the adhesive and backing.

FIG. 5D shows the same warp knit face fabric optionally positioned contrary to prior practice, with the traditionally recognized "pile" underlaps down, acting as trough loops, and with the overlaps up, assuming the role of peak or pile loops. This "pile-down" arrangement may be preferable in cases wherein the overlaps form a relatively dense layer, difficult to penetrate with adhesive. As shown in FIG. 5C, distance X for this arrangement is approximately equal to one half of distance L, which is the distance between overlaps 50, 50' etc. Using this arrangement, with the overlaps up and the underlaps against adhesive, longer underlaps, extended over more than one wale at every course or over every second or third or fourth course (1-0/2-3, 1-0/3-4, etc) can be used to achieve complicated design patterns without jeopardizing facial durability, since distance X is independent of underlap length. With the arrangement of FIG. 5A wherein the overlaps are as customary on top, overlaps extending across by more than one wale may result in distance X becoming excessive.

Figure 6A:
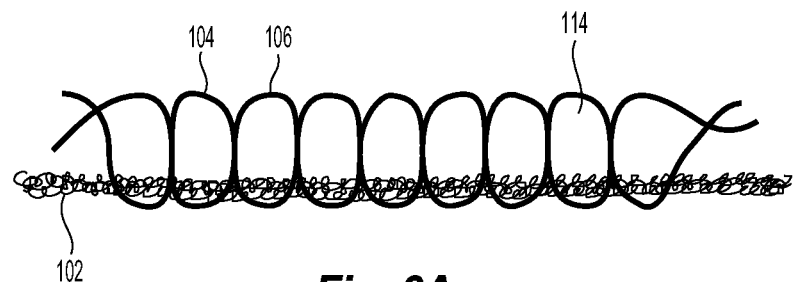
FIGS. 6A-6C illustrate various views of a warp knit embodiment of conventional floor coverings in which a planar anchoring sublayer holds the pile yarns in place.
Figure 6B:
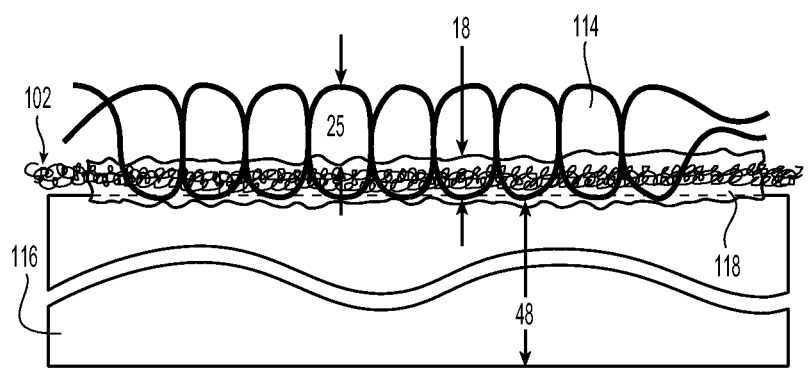
Figure 6C:
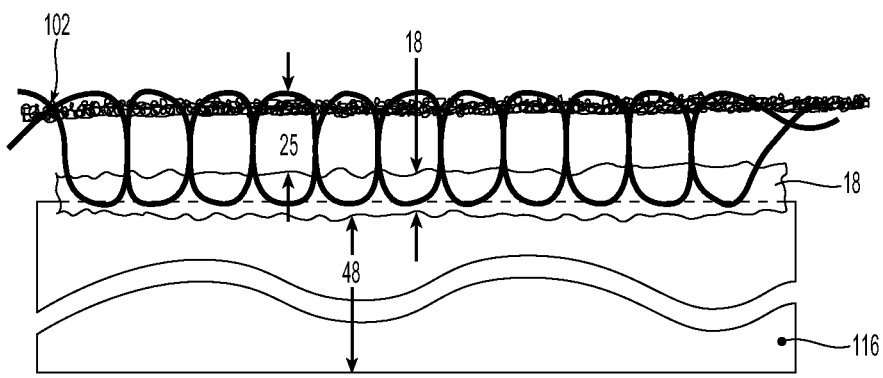

With underlaps up or down, the knit fabrics of this invention, as well as all other fabrics suitable for this invention, are free of stiff and fully planar stabilizing or anchoring base sub-layers. As a consequence they may be unstable and easily deformable, especially if formed with very low tension or if they have been bulked to increase thickness. Stability is provided by lamination with adhesive to a cushioning backing. For comparison, FIGS. 6A-6C show diagrammatic representations of a composite of prior art wherein the face fabric 114 is a stable "pile fabric" constructed upon and encompassing a stabilizing planarly stiff anchoring base sub-layer 102. This type of fabric, which is designed to be self-supporting, is used in upholstery, wall-coverings, abrasion-resistant apparel and similar uses, with or without adhesive added to the backside. It has also been used as a preferred face fabric in some floorcovering composites of prior art, shown within Group A in FIG. 1, both with the "pile" up and the "pile" down against the adhesive. Ordinarily the anchoring base sub-layers within the face fabric are planarly stiff by design, with stiffness increasing further if, as shown in FIG. 6B, the fabrics are laminated to a backing with the pile up. Adhesive unavoidably penetrates the anchoring base layer 102, increasing its density, rigidity and reaction to thermal and hygroscopic variations, further reducing its capability to absorb planar stress, and increasing its tendency to warp out of plane with changes in temperature or humidity.

FIGS. 7A-7E show an embodiment of the present invention wherein a planar sub-layer of a different type, is present within the face fabric. The fabric is constructed in the same manner as the warp-knit fabric of FIGS. 5A-5D, but it includes sub-layer 54 consisting of yarns inserted during the knitting process. Insertion of yarns during a warp knitting process can be performed by "laying-in" from a separate warp through a separate "knitting bar" or by knitting-in a shrinkable yarn from a separate warp and bar, or by using "warp insertion" or "weft insertion" techniques commonly known in the textile art. Yarns can be inserted in a rectilinear or zig-zag pattern. Optionally, the yarns of layer 54 are also shrinkable, and the fabric may be shrunk to densify the loops prior to lamination, as shown in FIG. 5B. Shrinking may be performed by raising the temperature above the shrinking temperature but below the melting temperature of the inserted yarns. Alternately the inserted yarns may be elastic, highly textured, or otherwise self-shrinking, in which case the formed fabric can be shrunk by being allowed to relax and gather.

Sublayer 54 may also be planarly conformable if the yarns within are elastic and deployed under some tension, and therefore able to expand and contract under planar stress. Sublayer 54 may also be planarly conformable if the yarns within are deployed in a zig-zag pattern allowing planar expansion and contraction. As an example for a warp-knit fabric, such as the one shown in FIGS. 7A-7C, sublayer 54 could be formed by laying in a 0-0/2-2 zig zag pattern.

If sublayer 54 is built with rectilinear inelastic yarns it is very likely non-conformable. If the inserted yarns are thermoplastic and shrinkable it is possible that the fabric be rendered planarly conformable by subsequently subjecting it to heat under planar restraint as shown in FIG. 7C. Temperature is raised above the melting point of sublayer 54, but below the melting point of the rest of the fabric, to convert sublayer 54 into a dispersed, loose, or discontinuous layer 56. After layer 54 has been converted into layer 56 the fabric structure of FIG. 7C may remain self-supporting. If it is not self-supporting, heating under planar constraint may have to be performed by holding the assembled fabric, adhesive and backing under low pressure, first applying heat, and then increasing pressure, in situ, to achieve lamination. FIG. 7D shows composite 10 with layer 54 converted into discontinuous layer 56 and with the underlaps up, and FIG. 7E with the underlaps down. Dimensions L, C and X, are determined in the same manner as with the equivalent embodiments of FIGS. 5A and 5D.

FIGS. 8A-8D illustrate another embodiment of this invention using the inventive step of heating under restraint to improve the planar conformabily of a woven fabric. The fabric incorporates arrays of shrinkable thermoplastic weft yarns 60 co-woven with surface-forming weft yarns 67 and warp yarns 58. FIG. 8B depicts fabric face layer 14 after heating the fabric to cause shrinkage and bulking. FIG. 8C shows the fabric after additional heating under planar restraint for breaking up the continuity of weft yarns 60 and converting them into a loose or discontinuous layer 69. FIG. 8D shows the fabric of FIG. 8C integrated with a backing. Steps 8C and 8D can optionally be performed in situ, as explained above. It is also possible to deploy a shrinkable warp yarn instead of or in addition to weft yarn 58 and cause machine-directional or two-directional shrinkage. Dimension X is equal to one half of dimensions L and/or C depending upon whether warp or weft yarns form the two surfaces of the woven fabric.

Figure 9A:
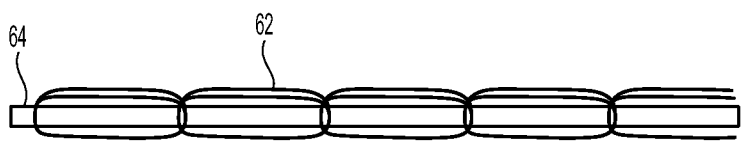
FIGS. 9A-9E illustrate a cross sectional view of an embodiment of the floor covering of the current invention in which surface-forming yarns are stitch-bonded into a shrinkable planar thermoplastic layer that can be rendered discontinuous prior to or during lamination to a cushion layer.
Figure 9B:
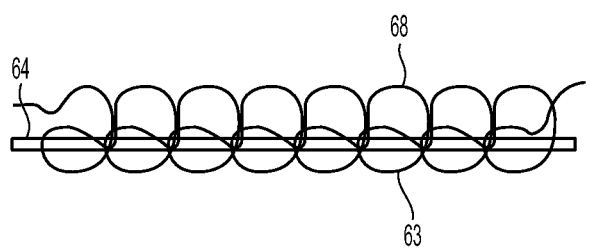
Figure 9C:
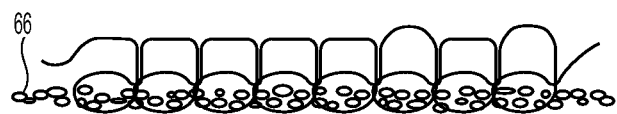
Figure 9D:
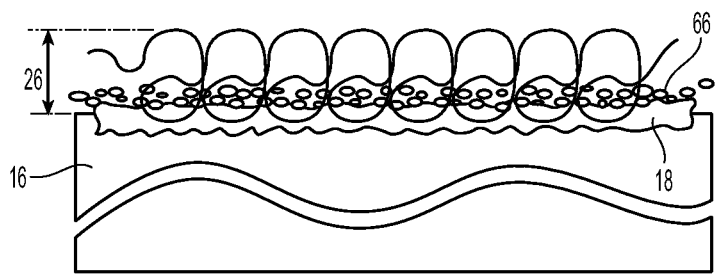
Figure 9E:
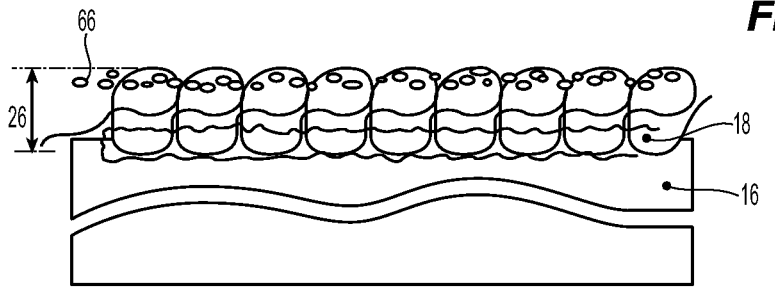

FIGS. 9A-9E show a further embodiment of this invention wherein face layer 14 is formed by stitch bonding yarns 62 into a shrinkable thermoplastic sub-layer 64, as shown in FIG. 9A. FIG. 9B shows fabric face layer 14 after initial heating and shrinking sub-layer 64 to generate free standing surface loops, trough "overlap" loops 63 and peak "underlap" loops 68. This fabric is equivalent to the warp-knit fabric of FIG. 5A, except for the presence of sub-layer 64. The process and product of FIGS. 9A and 9B are disclosed in the '327 and '761 patents by the current inventor, shown within Group A in FIG. 1, and previously incorporated by reference. The current invention provides the added inventive step of heating the stitchbonded fabric under planar restraint, causing sublayer 64 to break-up into open grids or into separated and dispersed segments, forming discontinuous layer 66. The steps shown in FIGS. 9C and 9D can optionally be performed in situ by heating the superposed face/adhesive and cushion under planar restraint first and then increasing temperature and pressure to complete lamination. The fabric can also be deployed with the underlaps against the adhesive, as shown in FIG. 9E, with the equivalent warp knit arrangement being the one shown in FIG. 5D. Dimensions L, C and X are determined in the same manner as in the case of the warp knits of FIGS. 5A and 5D, since a stitchbonded structure is equivalent to a warp knit, with a substrate inserted between stitches.

Figure 10A:
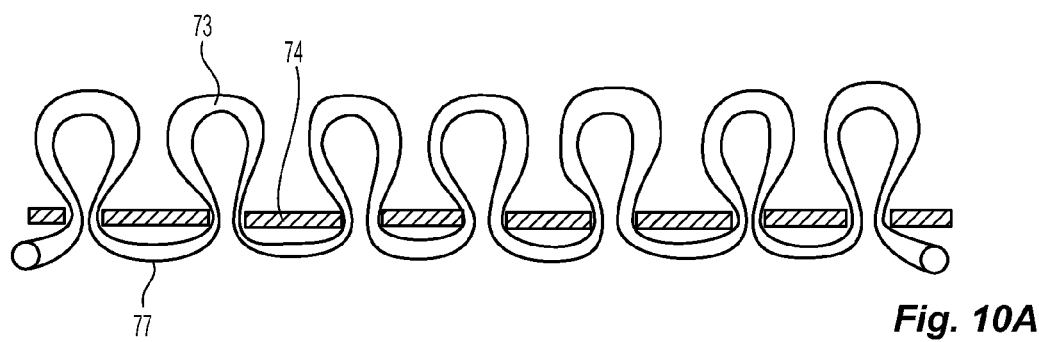
FIGS. 10A-10D illustrate a cross sectional view of an embodiment of the floor covering of the current invention in which surface-forming yarns are tufted into a shrinkable planar thermoplastic layer that can be rendered discontinuous prior to or during lamination to a cushion layer.
Figure 10B:
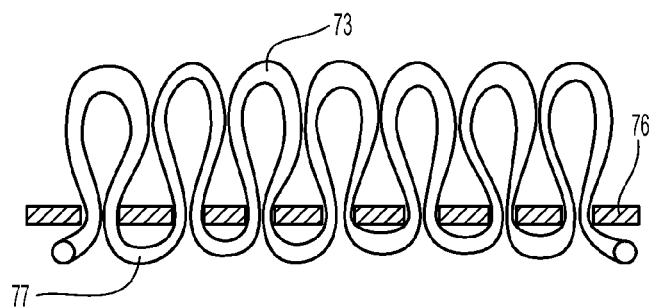
Figure 10C:
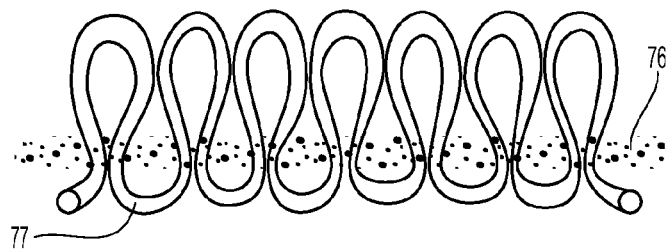
Figure 10D:
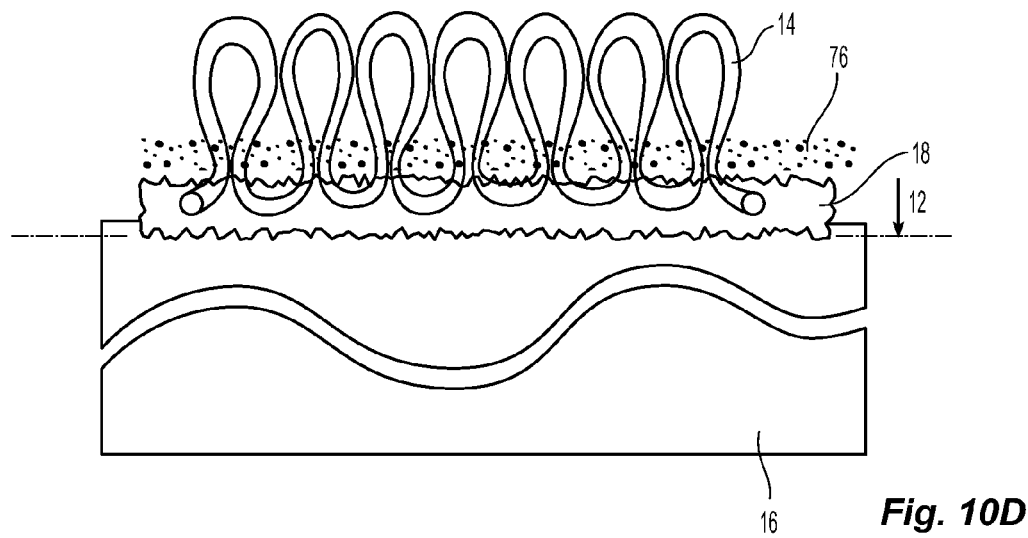

FIGS. 10A-10D illustrate yet another embodiment of this invention in which face fabric 14 is formed by tufting yarns 73 into a preformed shrinkable thermoplastic sub-layer 74, as shown in FIG. 10A. The tufted product may be optionally pre-shrunk causing the tufted "peak" loops 73 to densify and backlaps 77 to form "trough" loops on the bottom surface, as shown in FIG. 10B. To allow for final planar extensibility and planar compressibility the product of FIG. 10A or 10B is heated under restraint to cause sublayer 74 to break into substantially discontinuous layer 76, as shown in FIG. 10C, before lamination onto cushion layer 16 as shown in FIG. 10D. Planar heating under restraint and final lamination can also be optionally performed in a continuous operation in situ.

Preferably the tufted fabric is deployed with the pile up as shown in FIG. 10D, and dimension X is essentially nil since the peaks of the loops are located directly above the points where the yarns enter the adhesive layer. In this manner the backlaps 77 may travel along in straight lines or may follow short or long zigzag paths for the sake of design without affecting dimension X.

Figure 11A:
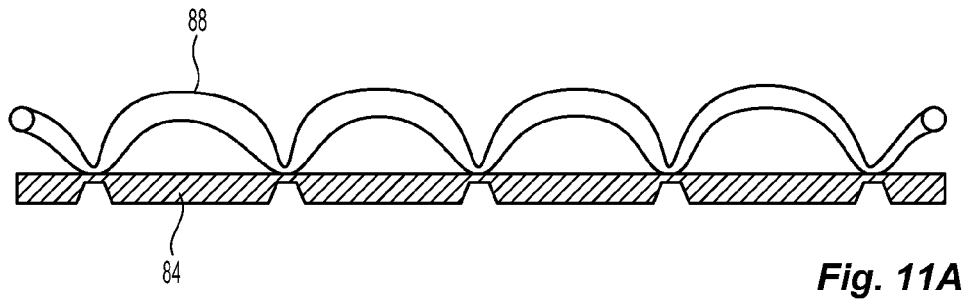
FIGS. 11A-11E are a cross sectional view of an embodiment of the floor coverings of the current invention with a "virtual pile" generated by intermittently attaching a surface-forming yarn to a shrinkable planar layer that can be rendered discontinuous prior to or during lamination to a cushion layer.
Figure 11B:
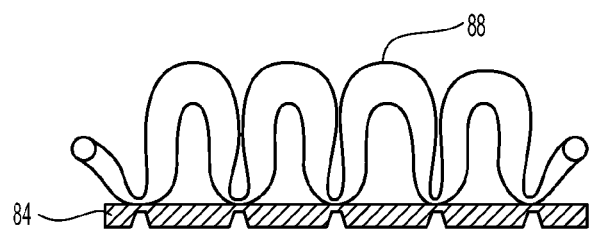
Figure 11C:
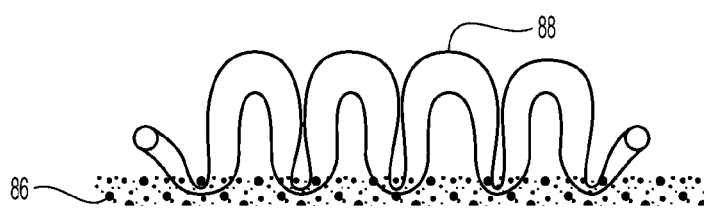
Figure 11D:
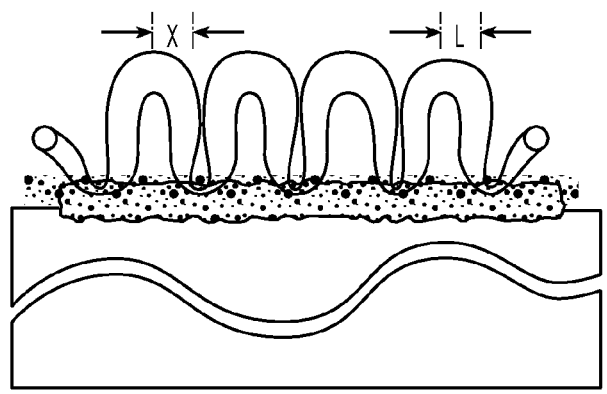
Figure 11E:
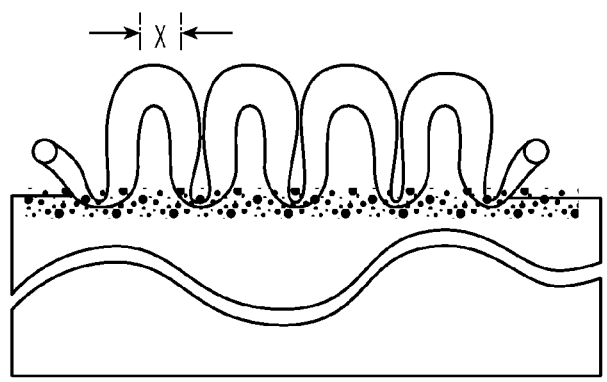

FIGS. 11A-11D illustrate still another embodiment of the current invention constructed with "virtual piles" of folded yarns formed by intermittently attaching warps of surface forming yarns 88 onto a "primary backing", in this case planar sublayer 84, as shown in FIG. 11A. The attached yarns may be straight or pre-raised or pre-folded between attachment points. FIG. 11B shows the optional step of densifying the fabric face layer 14 by heating and causing sublayer 84 to shrink. FIG. 11C illustrates the novel added step of this invention wherein sublayer 84 is converted into discontinuous layer 86, by subsequent heating under restraint. FIG. 11D illustrates composite 10 produced by laminating the fabric to a cushioning backing using a separate adhesive layer. FIG. 11E illustrates that the step of FIG. 11C and the added adhesive layer can be eliminated using the thermoplastic sublayer 84 as adhesive, and laminating the fabric of FIG. 11B or 11C directly onto a cushioning layer 16. As shown in FIGS. 11D and 11E, distance L is approximately equal to the spacing between bonds, and distance C is the spacing between warps. In this set-up dimension X is approximately equal to dimension $L/2$.

Beyond the embodiments described above a large variety of fabrics can be used as a face layer, provided that they have a structure compliant with the requirements described hereinabove. In all embodiments adhesive layer 18 penetrates both fabric face layer 14 up to level 41 and cushion layer 16 down to level 42. Portion 25 of fabric layer 14 above adhesive varies in height from between about 0.3 mm (0.12 inches) and 1.5 mm (0.06 inches), and preferably from about 0.3 mm (0.02 inches) to 1.0 mm (0.04 inches). The basis weight of portion 25 of fabric face layer 14 above adhesive is approximately in the range of about 150 $g/m^2$ to about 500 $g/m^2$ (4.4 to 14.7 $oz/yd^2$), and preferably about 200 $g/m^2$ to 300 $g/m^2$ (5.9 to 8.8 $oz/yd^2$).

In some preferred embodiments, fabric face layer 14 is free of a continuous planar internal sublayer that among other things anchors the yarns or fibers of the fabric face layers. For example, fabric face layer 14, when assembled into composite 10, is free of sublayers such at 54, 64 and 74 described above. When sublayers 54, 64 and 74 are broken up into sublayers 56, 66 and 76, respectively, the fabric face layer can be incorporated into the inventive floorcovering composites. Without being limited to any particular theory, the present inventor believes that anchoring sublayers may resist the lateral movements of the fibers and yarns in the fabric face layers and hindering their ability to act like micro springs. When these anchoring sublayers are broken up as discussed above into discontinuous fibrous or nonfibrous internal layers, these fabric face layers are suitable for the present invention. It is further noted that some suitable fabric face layers discussed above do not have any anchoring sublayers.

The fabrics may be optionally treated with repellent polymeric coatings, applied preferably throughout the entire fabric thickness, by immersion or surface application followed by squeezing. Treatment in this manner is particularly effective in the case of this invention because of the fine structure of the fabrics of this invention as compared to tall cushioning-pile floorcoverings. The porosity of the adhesive layer also allows repellent treatment of the face of the composite in situ, with the coating solution being adsorbed into the porous adhesive-containing layer without the necessity of treating the whole composite. Alternatively, the entire composite can be treated with repellant polymeric coatings.

The properties of the adhesive, and the depth of penetration, are controlled so that surface structure 46 remains planarly-compressible. Before activation, adhesive layer 18 can be solid or liquid, porous or nonporous, fibrous or non-fibrous, thermoplastic or thermosetting. Adhesives may include, but are not limited to, aqueous latex adhesives such as styrene-butadiene copolymers, ethylene/vinyl acetate copolymers, polyacrylates and blends thereof; suitable thermoplastic materials include polyvinyl chloride, polyethylene, polypropylene, polyurethane, polyolefins, ethylene/vinyl ester copolymers, ethylene/alkyl(methyl)acrylate copolymers, ethylene/olefin co-polymers, co-polyester, co-polyamide, and combinations thereof; and hot melt adhesives such as resins, tackifying resins, waxes, plasticizers and combinations thereof. Adhesive layer 18 may also contain non-adhesive reinforcing components, or a blend of adhesive components. Suitable basis weights for adhesive content within layer 18 range from about 2 oz/yd$^2$ (68 g/m$^2$) to about 10 oz/yd$^2$ (340 g/m$^2$), preferably from about 2 oz/yd$^2$ to about 6 oz/yd$^2$. If applied in liquid form they are most likely to set in a porous form. If applied in a solid thermoplastic form laminating pressure and temperature need to be co-regulated to achieve dispersion and penetration into the face layer and backing without excessive solidification.

Cushioning layer 16 provides sufficient flexibility to allow composite 10 properties to be formed within the required limits in terms of stability and durability. A wide variety of materials can be used as cushion layer 16 depending upon the desired final composite thickness, strength, flexibility, or cushion. In one embodiment, cushion layer 16 may be an elastic foam, including but not limited to foamed compositions of rubber, latex, hot melt resins, urethane, poly(vinyl chloride) resins or combinations thereof. In another embodiment it is a fibrous web using fibers ranging from 1.5 to 100 denier per filament and weighing at least about 12 oz/yd$^2$, and preferably between about 16 and 60 oz/yd$^2$. Fibers suitable for the web may include, but are not limited to, polyamide, polyester, polyolefin, jute, acrylic or cotton. In other embodiments, cushioning layer 16 is a needled web or felt of reclaimed carpet fibers, a thermally-consolidated batt of random fibers.

As discussed above, fabric face layer 14 and adhesive layer 18, inclusive of areas of adhesive penetration into cushion layer 42, constitute surface structure 46. In order to limit friction against foot traffic and lateral movement against adjacent tiles surface structure 46 has limited extensibility. It also has a measure of planar compressibility to accommodate stresses caused by traffic and differential hygroscopic expansion or contraction. Cushioning structure 48 is substantially deeper than surface structure 46, generally 1.5-5 times the thickness of the face structure. The resistance to planar compression and extension of cushioning structure 48 is substantially lower than the resistance of surface structure 46, so that shear and compression stresses are absorbed mainly by cushioning structure 48, with minimal strain on surface structure 46. Top surface 22 can be forced to shift laterally relative to bottom surface 37 by more than the thickness 12 of the entire composite before it stretches by 10%, preferably less than 5%, more preferably by less than 3%. The composite is also laterally compressible by at least about 1% without bulging out of plane, which, as noted above, is significant given that 1% planar compression can cause a vertical distortion exceeding 10% if the sheet cannot absorb the strain.

Flooring laminates of the current invention may be manufactured using various well-known methods. Fabric face layer 14 may have adhesive applied to its bottom surface 24 in any suitable manner, including but not limited to spraying, coating, kiss-roll coating, and/or lamination. Alternatively, adhesive may be incorporated on top surface 36 of cushion layer 16. In yet another embodiment, solid adhesive may be simply placed between fabric face layer 14 and cushion layer 16. Heat and pressure are applied to top surface 22 for a sufficient period of time to advance adhesive into the face fabric and cushioning backing and to cure or melt it without excessively deforming face layer 14. The depth of penetration of adhesive into fabric layer 14 can also be controlled by the construction of fabric 14, or by the composition the adhesive. The superposed components can also be preheated before applying pressure.

Composite/laminate 10 of the current invention is particularly suitable for applications requiring a combination of a soft fabric surface, high surface durability and overall planar stability, particularly useful as modular tile/floor coverings. Laminates are evaluated for planar compressibility, wear resistance, sheer stress transfer, bending length, and resistance to warping using the tests detailed below.

Figure 12A:
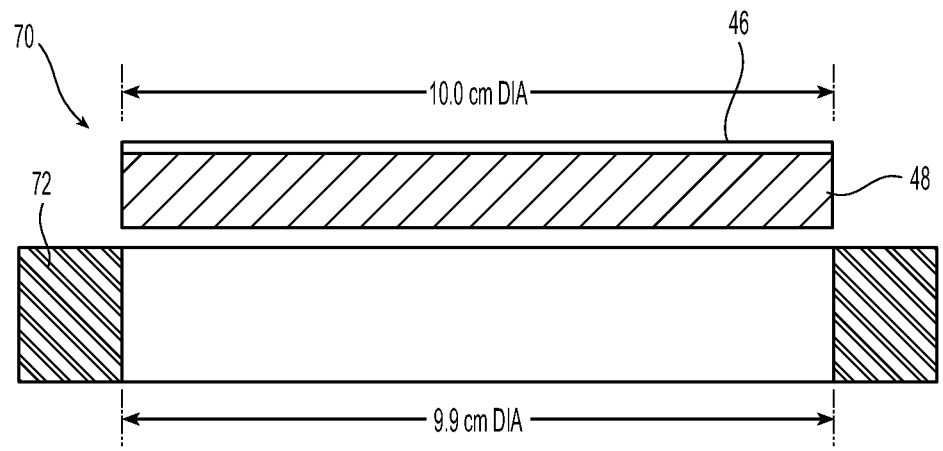
FIGS. 12A and 12B illustrates a test method for determining the planar compressibility of a floor covering.
Figure 12B:
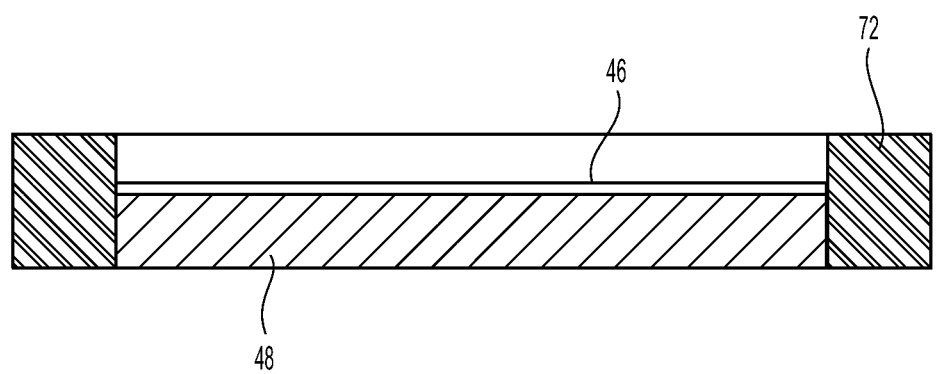

FIG. 12 illustrates the method used to determine planar conformability. Disk 70 of the composite 10 with a diameter of 10.0 cm is forced into a ring 72 having an internal diameter of 9.9 cm. If composite 10 does not bulge or otherwise deform within ring 72 as shown in FIG. 12A or 12B, the laminate exhibits suitable planar stability, i.e., the ability to gather by at least 1% in the planar direction without deforming out of plane.

Floor durability may be evaluated using a Vetterman Drum test apparatus. The drum is lined with test samples. A 7.3 kilogram (16 pound) steel ball covered with hard rubber protrusions rolls randomly inside the rotating drum. The drum rotates at 1,000 revolutions per hour, reversing direction every 100 revolutions. Abrasion resistance is reported on a scale of 1-4 with a rating of 4 indicating no perceptible surface deterioration, a rating of 2 indicating acceptably small facial deterioration, and a rating under 2 indicating unacceptable abrasion.

Figure 13A:
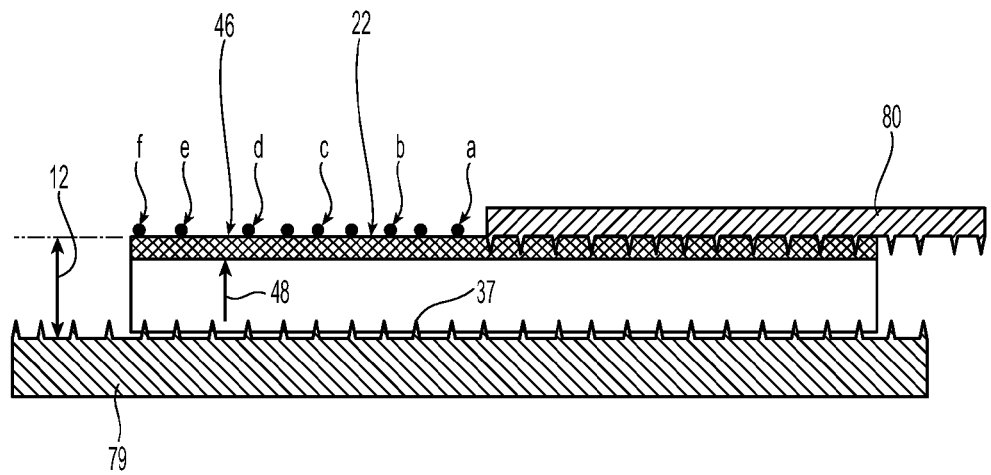
FIGS. 13A and 13B illustrates a test method for determining shear-stress transfer from the surface layer to the cushioning layer of flooring composite.
Figure 13B:
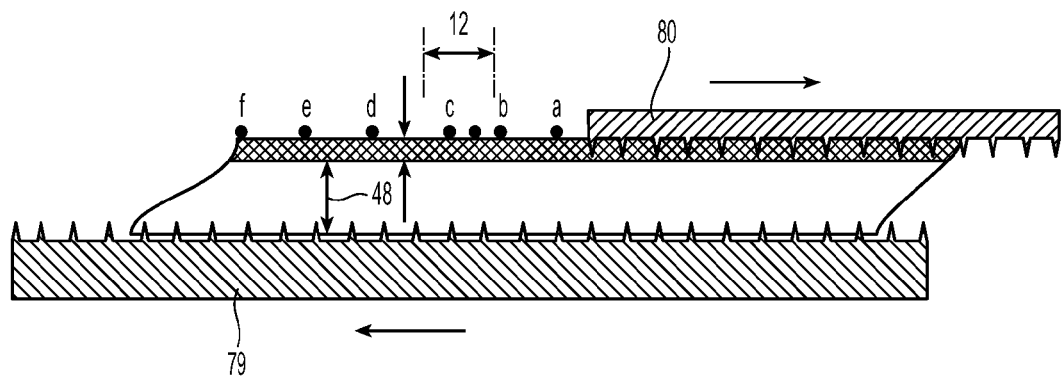

FIGS. 13A and 13B illustrate the set-up used to determine the absorption of planar shear by cushioning layer 48 with negligible deformation of face layer 22. The entire bottom surface 37 of a sample of the composite is attached to hook plate 79 representing the floor. The surface 22 is attached to hook plate 80 representing forward moving foot contact. The length of sample attached to plate 80, and the width of the sample are chosen to be 2 inches or 5 cm to limit the force required to laterally shift the two plates versus each other. Markings a, b, c, d, etc. are placed every cm along the unattached part of the top surface as shown in FIG. 13A. Plate 80 is shifted sidewise by a distance 12 equal to the thickness of the composite. Visible elongation, within approximately 0.5 mm at every cm of length is determined. The laminate is suitable for use as a modular floor covering if surface 22 elongates less than 10%, preferably less than 5% at any marking. Most or all of the lateral shear-strain is absorbed by the cushion layer. Most preferably surface 22 elongates by less than about 1%. Generally it does not perceptibly elongate.

Figure 14A:
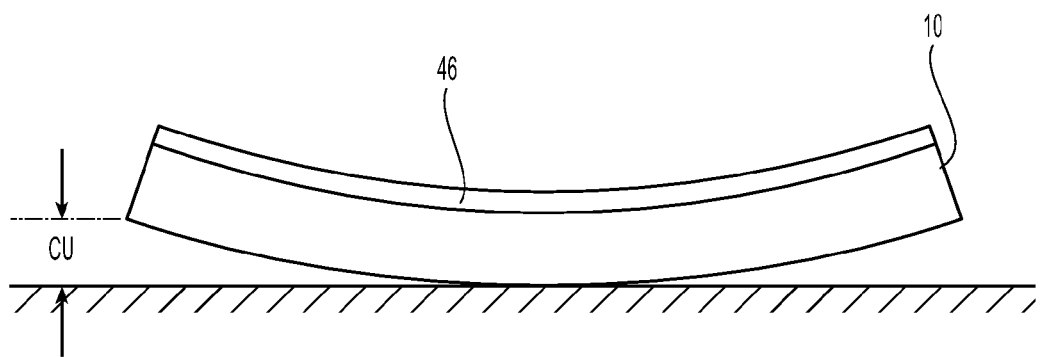
FIGS. 14A and 14B provide side views of a flooring composite and illustrate cupping and doming.
Figure 14B:
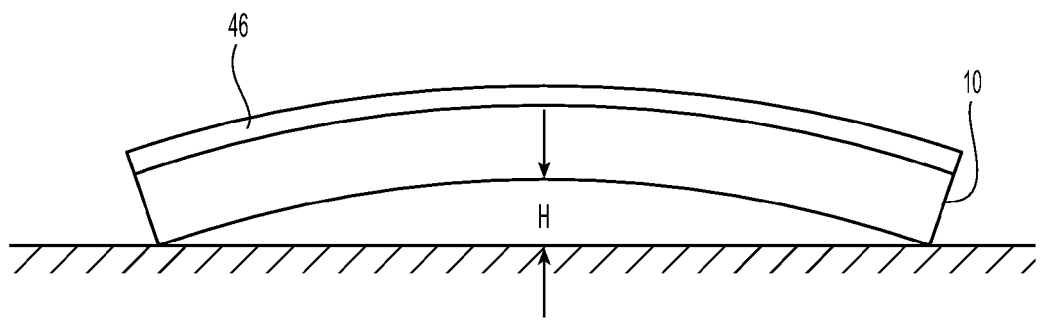

Resistance to warping is determined by immersing a sample measuring 8 inches×8 inches in water at room temperature for 24 hrs, then placing the sample in an oven for 24 hours at 60° C. to fully dry, and then placing the sample against a flat surface, as shown in FIG. 14. If composite 10 starts flat and stays flat against the surface, with no central gap H (doming) as shown in FIG. 14B, or edge gap CU (curling) as shown in FIG. 14A, larger than 2 mm, after resting on the surface for 24 hrs, it is considered suitable for use as a floor covering.

Fluid barrier layers 118, as best shown in FIG. 4A, can also be added under the adhesive layer and followed by a secondary adhesive layer 119 underneath attaching it to the cushion layer, provided that the barrier layer is sufficiently porous or microporous, or simply planarly compressible to avoid resistance to planar gathering. The porous adhesive systems and the limited planar compressibility required by this invention make it possible to add a variety of such barrier layers, including thin thermoplastic films. Some of these barrier layers are capable of blocking liquids spilled from heights a large as 1 meter and holding the spill above the barrier layer for as long as 24 hrs. Some also can allow the escape of water vapor upwards while holding liquids above the barrier layer. Preferably, the barrier layer is liquid impermeable but vapor permeable. Suitable such barrier layers are preferably hydrophobic and/or oleophobic and by gas permeable and can be made from polytetrafluoroethylene (PTFE), nylon, polyamides, polyvinylidene, polypropylene, polyethylene, etc. Commercially available PTFE microporous membranes can be obtained from W.L. Gore Associates, Inc.

EXAMPLES

The following examples are merely illustrative of certain embodiments of the invention. They are not meant to limit the scope and breadth of the present invention, as recited in the appended claims.

Example 1

Weft-Knit Staple-Yarn Face Fabric, Group E (See FIG. 4A)

A weft-knit 1.6 mm thick white commercial weft-knit bulked ladies shirt fabric of spun cotton yarns, weighing 9.2 oz/yd$^2$ (312 g/m$^2$) of the type diagrammatically illustrated in FIG. 4A, was used as fabric face layer 14. Cross-sectional enlargements of the fabric showed a looped yarn structure reciprocating between the two surfaces, with a frequency of about 32/inch (13/cm) in the longitudinal direction, and 40/inch (16/cm) in the transverse direction. Dimensions L, C and X were calculated from these values to be approximately 0.8, 0.6 and 1.0 mm, as listed in Table I. The fabric was soft, but highly unstable, highly stretchable, and very easy to abrade.

The fabric was combined with a 0.15 mm thick low density black polyethylene film weighing approximately 145 g/m$^2$ placed over a felted fibrous nonwoven cushioning backing containing 65% polyester fibers and 35% polypropylene fibers, weighing 650 m$^2$, and approximately 6 mm thick. The backing had been subjected to approximately 80 needle penetrations per cm$^2$, and it was soft and reversibly stretchable and compressible. The three components were laminated using a press with the top plate heated to 200 degrees C., descending onto the fabric at a rate of 6 inches per minute. When pressure reached 1000 psi, the platen were held together for 2 more seconds and then separated at the same rate of 6 inches per minute. The 5.2 mm thick laminated composite was allowed to cool while held flat. The same adhesive film, backing and lamination process was used in all examples cited below.

The thicknesses, weights and void fractions of sublayers 25, 18 and 48 for this example and all other examples are also listed in Table I. For all examples, the same procedure was used to determine these thicknesses weights, densities and void fractions: The face fabric thickness 25 over black adhesive and backing thickness 48 under black adhesive were determined but cutting three cross sections, measuring each thickness and averaging the three readings. Since the thickness of sublayer 18 containing black adhesive was relatively small, it was also calculated as a cross-check by separately calculating all nine combinations of the readings of the thicknesses of layers 25 and 48, subtracting each from the overall thickness 12 and averaging the nine remainders within the nearest 0.1 mm.

The weight of sublayers 25 in all examples were estimated by proportioning fabric weight from initial fabric thickness 26 down to thickness 25. The weight of the backing thickness below the adhesive was determined by forcefully peeling the backing from surface structure 46. Most of the weights of backing thickness 48 below adhesive were consistently approximately 620 g/m$^2$ out of an initial 650 g/m$^2$, with one exception that was around 600 g/m$^2$. The peel resistance between backing and adhesive layer was consistently high, above 1 kg per cm, with the peeling failure occurring within the backings.

Void fractions in all examples were calculated assuming a specific gravity of 1.35 for the material of sublayer 25, e.g., cotton and polyester within sublayer 25, 0.9 for polyolefin (polyester or polypropylene), and 1.1 for the material within sublayers 18 and 48, e.g., mixtures of cotton or polyester with polyolefin within sublayers 18 and 48. The measurements and calculations performed to estimate void fractions are subject to variation by approximately 5-10%. They were performed to confirm the effect of porosity or void fraction on the present invention.

The Calculations of the Void Fractions of Example 1 are Provided Below.
Portion of Face Layer Above Adhesive 25:
Averaged Observed Thickness: 1.2 mm
Estimated Weight: (312 g/m$^2$)·(1.2 mm/1.6 mm)=234 g/m$^2$
Estimated Void %: $1-\{[234/(1.2/10)\cdot(10,000)]\}/\{1.35\}=0.855$ or 86%
Cushioning Structure 48:
Averaged Observed Thickness: 3.6 mm
Peeled Weight Below Adhesive: 620 g/m$^2$
Calculated % Void: $1-\{[620/[(3.6/10)\cdot10,000]\}/\{1.1\}=0.844$ or 84%
Adhesive Composite Layer 18, Including Portions of the Face Layer and the Cushioning Layer:
Calculated thickness: 5.2−3.6−1.2=0.4 mm
Calculated Weight: 1,110−620−234=256 g/m$^2$
Calculated % Void: $1-\{[256/[(0.4/10)\cdot10,000)]\}/\{1.1\}=0.418$ or 42%

Table I indicates that void fractions for all sublayers within the composite of Example 1 varied between approximately 42% and 86%, indicating a porous structure throughout. The composite was surprisingly durable with a Vetterman rating above 3.5. It also compressed easily 1% without bulging out of plane, and stretched imperceptibly on the surface when subjected to shear. It also exhibited no tendency for fibers to rise or fray at the cut edges, and no sign of warping before or after being soaked in water and dried in an oven.

Example 2

Lightweight Warp-Knit Face Fabric, Underlaps Up, Group E (See FIG. 5A)

A warp-knit polyester fabric was prepared on a 28-gauge knitting machine using a single bar stitching 1-0/1-2 at 20 CPI with 150 denier/34 filament textured nylon feeding two ends per guide. The knit weight was approximately 4.8 oz/yd$^2$, or 163 g/m$^2$. The product gathered automatically in the cross-direction by approximately 25% from 60 inches to 45 inches as it was wound up, while there was a small change in length, with the gage changing to approximately 40/inch and the CPI to 22/inch to a density of approximately 880 loops/sq inch or 146/sq cm. For this configuration, with the underlaps up, dimensions C, L and X were calculated to be approximately 1.1, 0.6 and 0.6 mm. The gathered fabric had a thickness 26 of 1.6 mm, and weighed approximately 6.3 oz/yd$^2$ or 210 g/m$^2$. The fabric was easily stretchable and dimensionally unstable, and had very low resistance to abrasion.

After lamination under the same process conditions as Example 1, the resultant composite had a thickness of 5.6 mm. Relevant dimensions, densities and performance levels are listed in Table I. The product remained sufficiently porous, with a minimum void fraction of 32%, sufficient to pass the planar compression test. Vetterman ratings around 2.0 are in the acceptable range. Warp resistance and resistance to surface deformation were satisfactory.

Example 3

Lightweight Warp Knit with Underlaps Down, Group E (FIG. 5D)

The fabric of Example 2 was inverted during lamination with the overlaps down. As shown in Table I adhesive penetrated deeper into the fabric, porosity was redistributed and conformability improved. Durability also marginally improved to 2.5

Example 4

Warp-Knit Face Fabric Containing a Gatherable Sub-Layer of Laid-in Yarns Convertible into a Discontinuous Sub-Layer, Group E (See FIG. 7E)

A warp knit fabric was prepared using two bars, with heavier textured 450 denier/100 filament end polyester, knit with a 1/0-1/2 pattern at 14 gauge and 14 CPI on the front bar, and 270 denier partially-oriented polyester yarn in a "zigzag" 2/2-0/0 laid-in pattern on the back bar. The fabric as-knit weighed approximately 5.7 oz/yd$^2$ with the planar laid-in yarn weight being approximately 0.8 oz/yd$^2$ and the knit in yarn 4.9 oz/yd$^2$. Upon subjecting to heat at 380° F. for 45 seconds the fabric gathered by approximately 40% in both directions to a weight of 11.2 oz/yd$^2$ or 380 g/m$^2$, and had a thickness of 2.0 mm. The bulked polyester yarns formed loops reciprocating between the two surfaces with a frequency of approximately 20/inch in both directions, with a density of approximately 395/inch$^2$ or 61/cm$^2$. The shrunk laid-in yarns remained planar, and they were covered by the stitched-in yarns forming the two surfaces of the fabric.

The fabric was then laminated to a cushioning backing using the process of Example 1 (200° C., 1,000 psi, 2 sec.) with the underlaps down. Fabric thickness 25 above adhesive was 1.2 mm and the ratio of X/25 was 0.5/1. As listed in Table I, all void fractions were between 35% and 86%.

The composite exhibited high conformability and resistance to surface deformation, negligible warping, and superior surface wear near 4.0.

Example P-1

Concentrated Adhesive Layer. Stiff Due to Extra Adhesive (Prior Art, FIG. 7A, Group A)

Example 4 was reproduced, with the underlaps up. Adhesive remained concentrated in a very thin layer against the dense technical front. Relevant dimensions and properties are shown in Table I. Resistance to surface wear and shear stretch remained high, but planar conformability and resistance to warping were very poor.

Example P-2

Figure 7A:
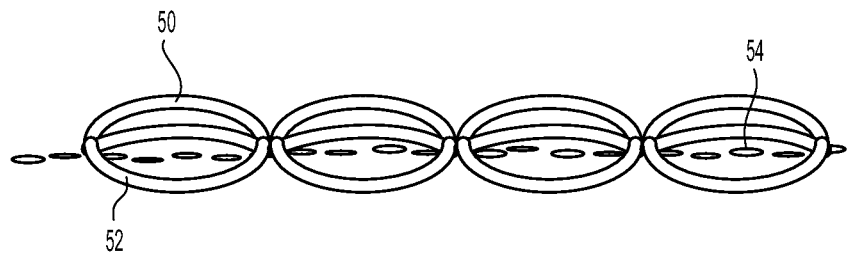
Figure 7B:
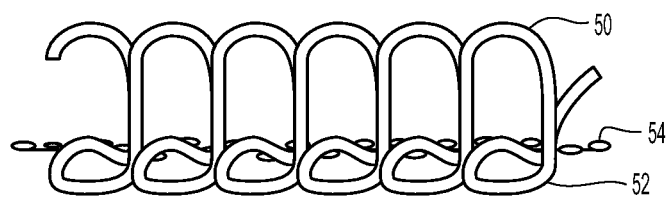
Figure 7C:
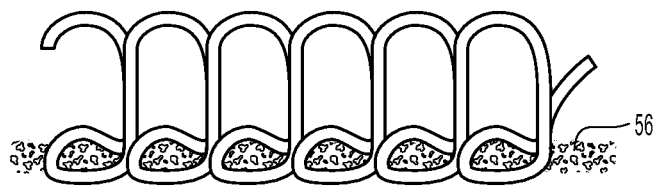
Figure 7D:
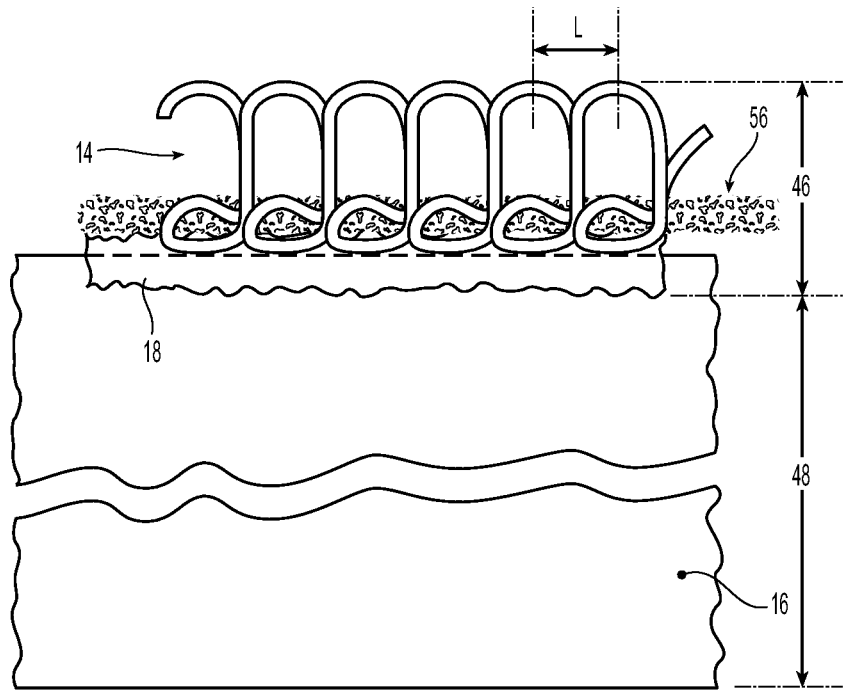

Face Structure with Flat Loops with Length X Larger than Dimension 25 (Prior Art, FIG. 7A, Group A)

Example 4 was reproduced without the shrinking step. Preferred properties are listed in Table I. The height of fabric over adhesive was dramatically diminished, and the ratio of dimension X/dimension 25 rose above 1.0. The product was not sufficiently durable, with a Vetterman rating of only 1.5. It was stiff with a solid feel, failed the circular compression test and warped up by 4-5 mm at the corners.

The comparison of Examples 4 and P-1 demonstrates that adhesive density and distribution, especially within zone 18 at the interface of face fabric and cushion, should be balanced in constructing a stable and durable product. The comparison of Examples 4 and P-2 demonstrates that low and flat loops in the face fabric reduce durability and conformability

Example P-3

Traditional Pile Face Fabric/Pile Face Up. Anchoring Base Sublayer within Face Fabric—Too Flat and Stiff (Prior Art, FIG. 6B, Group A)

A commercial dense and durable knit upholstery pile fabric, previously disclosed in Examples 8 and 8A of U.S. Pat. No. 7,622,408, was laminated in the traditional manner, with the pile up, to the same backing using the same the adhesive film and the same conditions used in Examples 1-4 (1,000 psi, 200° C., 2 sec dwell). As illustrated in FIG. 6A the fabric 114 was built with floated loops 104 and 106 inserted into a co-formed planar anchoring base layer 102 with a loop density of approximately 28/inch in both directions, or approximately 121 loops/sq cm. Dimension X was approximately 1.3 mm. The fabric weighed 12.8 oz/yd$^2$, or 435 g/m$^2$ and had a thickness 26 of 1.1 mm. To determine the weight and density of base layer 102 the floated loops were manually extracted from a small sample measuring one inch by one inch. The thickness of the remaining base layer was approximately ¼ mm and its weight approximately 280 g/m², translating to a density of 0.83 g/cc and a void fraction of 17%, based on a yarn specific gravity of 1.35. Adding the floated yarn weight within a thickness of 0.25 mm out of a thickness of 1.5 mm (approximately 25 g/m²) this layer was estimated to have a density of approximately 0.90 g/cm³ and a void fraction of only 10%.

During lamination adhesive penetrated into approximately one half of the dense base layer and somewhat deeper into the backing. The backing lost approximately 50 g/m² when peeled by force. The approximate dimensions, estimated proportional weights and calculated void fractions are listed in Table I. In addition to the large X/25 ratio, the overall density of layer 18 was extremely high and its porosity essentially nil. The product was non-conformable, and planarly unstable.

Example P-4

Prior Art Pile Fabric Reversed. Base Layer within Face Fabric Too Flat and Stiff Even without Adhesive (FIG. 6C, Group A)

Example P-3 was repeated with the fabric reversed, and the pile down against the adhesive. Performance improved, although, as shown in Table I. Despite the absence of adhesive in the anchoring base layer of the knit upholstery pile fabric which was now situated on top of the composite and away from the adhesive, the high density and resultant stiffness of the base layer built into the original fabric interfered with conformability and balance, and the composite failed the planar compression and warping tests.

Example 5

Stitchbonded Face Fabric, Reheated Under Constraint (FIG. 9E, Group E)

A warp of 600 denier textured nylon yarns were stitchbonded into a 4.3 oz/yd² (145 g/m²) commercial polyethylene film layer at 14 gauge and 14 CPI with a 1-0/1-2 pattern. The stitched fabric, diagrammatically represented by FIG. 9A, weighed 9.8 oz/yd² (330 g/m²), including 145 g/m² film and 185 g/m² yarn. This fabric, which was relatively flat, stiff and 1.0 mm thick, was processed through an impingement oven, and overfed by 15% onto the support belt and heated to 150° C., whereupon it gathered by the shrinking action of the film by 15% in the machine direction and 10% in the cross-direction to approximately 12.8 oz/yd² including the 183 gm/m² film and 252 g/m² yarn, and had a thickness of approximately 1.8 mm. Loops of overlaps and underlaps totaling approximately 248/in² or 38/cm² covered each surface of the fabric. This fabric was typical of fabrics disclosed in U.S. Pat. Nos. 6,936,327 and 7,255,761, which in this example is used as a precursor and is further processed.

The fabric was constrained in a supported pin frame, the temperature was raised to 200° C. and the fabric was heated and allowed to cool without further shrinkage. The film within the fabric disintegrated into segments between the yarn-insertion points, and melted and flowed along the looped yarns. The fabric was then placed over a second sheet of the same polyethylene film and cushion layer as in Examples 1-4, with the underlaps down, and laminated under the same conditions as those of Examples 1-4. The dimensions, and proportioned weights and void fractions of each layer are summarized in Table 1.

The composite had excellent resistance to delamination, and high durability, exceeding a rating of 3.5 after 25,000 Vetterman cycles. It also passed the planar contraction and shear resistance tests and exhibited no cupping or doming after the dimensional stability test.

Example P-5

Stitchbonded Fabric as Per U.S. Pat. Nos. 6,936,327 and 7,255,761. (Plastic Layer Contained within Face Fabric Too Stiff and Non Gatherable, FIG. 9B, Group A)

The procedure of Example 5 was repeated without the intermediate constrained heating step. Preferred dimensions, weights and ratios are listed in Table I. The molten films remained concentrated within a smaller thickness than the dispersed films of Example 5, forming a relatively stiff and dense layer 18 with a calculated void fraction of only 14%. The composite did not pass the lateral compression test and showed a tendency to warp.

Example P-6

Stitchbonded Fabric with Shallow Loops and Unbroken Planar Plastic Layer. (Plastic Layer within Face Fabric Too Stiff and Non Gatherable; X is Also Larger than Dimension 25, FIG. 9A, Group A)

The procedure of Example 5 was repeated using the stitchbonded fabric without shrinking or constrained heating, producing a fabric like the one represented by FIG. 9A with 196 loops/in² or 30/cm². Dimension 26 was approximately 1.0 mm. After lamination fabric thickness 25 above adhesive was approximately 0.7 mm, and ratio X/25 up to 0.9/0.7 or 1.3. Measured and calculated dimensions, properties and ratios are shown in Table I. The product was not conformable, and had poor surface durability.

Example 6

Folded-Yarn/Virtual-Pile Face Fabric (FIG. 11E, Group E)

A 16/inch warp of three lightly twisted ends of 600 denier textured polyester yarns was thermally bonded to a 4.3 oz/yd² polyethylene film with a series of parallel cross-laid bond lines arranged at 2 mm intervals. The yarns were overfed into a gear-like bonding nip so that they were undulating and partially raised between attachment points as shown in FIG. 11A. The bonded assembly was then overfed by a ratio of 1.8:1 into an impingement oven raised to 200° C. The bonding intervals shrunk to 1.1 mm or 20/inch and the attached yarns formed peak loops rising to a total height of approximately 1.6 mm over the attached trough loops. The total weight of the fabric was 515 g/m², with yarn accounting for 245 g/m².

The composite was placed over the same cushioning layer as that of Examples 1-4 without a separate intermediate adhesive layer, and laminated under the same conditions with the polyethylene film acting as the adhesive layer. Referring to FIG. 11 the ratio of distance X equaled one half of distance L or approximately 0.6 mm with the ratio of distance X over thickness 25 being approximately 0.5/1, listed in Table 1. The composite was 5.8 mm thick, durable and stable. It earned a rating of 3.5 after 25,000 Vetterman cycles and passed the compression and dimensional stability tests.

TABLE I

| | Example # | | | | | | | | | | | |
|---|---|---|---|---|---|---|---|---|---|---|---|---|
| | 1 | 2 | 3 | 4 | (P1) | (P-2) | (P-3) | (P-4) | 5 | (P-5) | (P-6) | 6 |
| Figure #/Group | 4A/E | 5A/E | 5D/E | 7E/E | 7D/A | 7A/A | 6B/A | 6C/A | 9E/E | 9B/A | 9A/A | 11E/E |
| | | | | Warp Knit with Shrink Layer | | | Prior Art | | Stitch-Bonded, Underlaps Down Against Adhesive | | | Bonded Warp, |
| | Weft Knit | Warp Knit U-Laps Up | Warp Knit U-Laps Down | Shrunk, Underlaps Down | Not Shrunk UP | Not Shrunk U-laps Down | Pile Fabric Pile Up | Pile Fabric Pile Down | Shrunk Re heated | Shrunk Only | No Shrink | Shrink & Reheat |
| Face Layer | | | | | | | | | | | | |
| Yarn Weight, g/m² | 312 | 210 | 210 | 380 | 380 | 194 | 435 | 435 | 252 | 252 | 198 | 245 |
| Starting Thickness, mm | 1.6 | 1.6 | 1.6 | 2.0 | 2.0 | 1.4 | 1.1 | 1.1 | 1.8 | 2.0 | 1.0 | 1.6 |
| Dimension C, mm | 0.8 | 1.1 | 1.1 | 1.3 | 1.3 | 1.8 | 0.9 | 0.9 | 1.6 | 1.6 | 1.8 | 1.6 |
| Dimension L, mm | 0.6 | 0.6 | 0.6 | 1.3 | 1.3 | 1.8 | 0.9 | 0.9 | 1.5 | 1.5 | 1.8 | 1.1 |
| Dimension X, mm | 1.0 | 1.0 | 1.0 | 0.7 | 0.9 | 0.9 | 1.3 | 1.3 | 0.8 | 0.8 | 0.8 | 0.6 |
| Composite | | | | | | | | | | | | |
| Thickness, mm (12) | 5.2 | 5.6 | 5.4 | 5.2 | 5.2 | 5.2 | 4.6 | 4.6 | 5.6 | 5.3 | 4.8 | 4.1 |
| Weight, g/m² | 1,110 | 1,005 | 1,005 | 1,175 | 1,175 | 1,050 | 1,230 | 1,230 | 1,230 | 1,230 | 1,170 | 1,110 |
| Above Adhesive (25) | | | | | | | | | | | | |
| Thickness, mm | 1.2 | 1.2 | 1.2 | 1.4 | 1.8 | 0.8 | 1.0 | 0.7 | 1.2 | 1.1 | 0.7 | 1.2 |
| Est. Weight, g/m² | 234 | 158 | 158 | 266 | 342 | 111 | 290 | 276 | 168 | 139 | 138 | 184 |
| Approximate Void % | 86 | 90 | 90 | 86 | 86 | 90 | 79 | 71* | 90 | 91 | 85 | 89 |
| Below Adhesive (48) | | | | | | | | | | | | |
| Thickness, mm | 3.6 | 4.1 | 3.8 | 3.4 | 3.2 | 4.0 | 3.3 | 3.3 | 3.8 | 3.7 | 3.7 | 3.5 |
| Est. Weight, g/m² | 620 | 620 | 620 | 620 | 620 | 620 | 600 | 620 | 620 | 620 | 620 | 620 |
| Approximate Void % | 84 | 86 | 85 | 83 | 83 | 86 | 83 | 83 | 85 | 85 | 85 | 86 |
| Within Adhesive (18) | | | | | | | | | | | | |
| Calc. Thickness, mm | 0.4 | 0.3 | 0.4 | 0.4 | 0.2 | 0.4 | 0.3 | 0.4 | 0.6 | 0.5 | 0.4 | 0.4 |
| Calc. Weight, g/m² | 256 | 227 | 227 | 289 | 213 | 320 | 340 | 334 | 442 | 470 | 412 | 306 |
| Approximate Void % | 42 | 32 | 49 | 35 | 3 | 27 | ~0 | 24 | 33 | 14 | 7 | 30 |
| Ratio X/25 | .08 | 0.5 | 0.4 | 0.5 | 0.5 | 1.1 | 1.3 | 1.9 | 0.5 | 0.7 | 1.3 | 0.5 |
| Ratio 48/46 | 2.3 | 2.7 | 2.4 | 1.9 | 1.6 | 3.3 | 2.5 | 3.0 | 2.2 | 2.3 | 3.4 | 2.2 |
| Testing | | | | | | | | | | | | |
| Compression >1% | Pass | MP | Pass | Pass | F | Pass | F | MP | Pass | F | Pass | Pass |
| Stretch <10% | Pass | Pass | Pass | Pass | Pass | Pass | Pass | Pass | Pass | Pass | Pass | Pass |
| Warping | Pass | Pass | Pass | Pass | Pass | F | F | F | Pass | F | F | Pass |
| Vetterman | Pass | MP | Pass | Pass | F | F | MP | F | Pass | Pass | F | Pass |

F = Fail
MP = Marginal Pass
*Void Fraction in the upper part is only 10%

According to the data from the Examples and presented in Table 1, floorcoverings according to the present invention preferably have a void percentage within adhesive layer 18 greater than about 15%, preferably greater than about 20%, more preferably greater than about 25% and even more preferably greater than about 30%. The ratio of dimension X over length 25 is less than about 1.0, preferably less than about 0.8 and more preferably less than about 0.6 and even more preferably less than about 0.5. The thickness ratio of cushioning structure 48 to surface structure 46 is preferably between about 1.5 to about 5.0, as discussed above. As shown in Table 1, the ratio of dimension 48 over dimension 46 is greater than about 1.5, preferably greater than about 2.0 and preferably greater than about 2.5.

While various embodiments of the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment.

The invention claimed is:

1. A floorcovering composite comprising a fabric face layer joined to a cushioning layer with adhesive partially penetrating both layers forming an adhesive composite layer (18), wherein the surfaces of the face fabric are formed with yarns reciprocating from one surface to the other surface forming peak loops and trough loops, and wherein the yarns forming peak loops descend from the peaks into adhesive within a lateral distance X,
    wherein a first ratio of X to a first thickness (25) of the face fabric above the adhesive composite layer (18) is less than about 1.0, and
    wherein a void percentage of the adhesive composite layer (18) is greater than about 15%.

2. The floorcovering composite of claim 1 wherein a basis weight of the fabric face layer exceeds 200 g/m², and the fabric face layer is free of a continuous planar anchoring sublayer.

3. The floorcovering composite of claim 2, wherein the fabric face layer comprises discontinuous fibrous or non-fibrous internal sublayer.

4. The floorcovering composite of claim 1, wherein a planar recoverable surface stretch of the composite is less than about 10%.

5. The floorcovering composite of claim 2, wherein a second ratio of a second thickness (48) of the cushioning layer to a combination of the adhesive composite layer (18) and the first thickness (25) is greater than about 1.5.

6. The floorcovering composite of claim 2, wherein the first ratio is less than about 0.8.

7. The floorcovering composite of claim 6, wherein the first ratio is less than about 0.6.

8. The floorcovering composite of claim 2, wherein the void percentage is greater than about 20%.

9. The floorcovering composite of claim 2, wherein the void percentage is greater than about 25%.

10. The floorcovering composite of claim 2, wherein the void percentage is greater than about 30%.

11. The floorcovering composite of claim 5, wherein the second ratio is greater than about 2.0.

12. The floorcovering composite of claim 5, wherein the second ratio is greater than about 2.5.

13. The floorcovering composite of claim 5, wherein the second ratio is less than about 5.0.

14. The floor covering composite of claim 2 has an average void fraction of greater than about 10%.

15. The floorcovering composite of claim 2 wherein the average void fraction is greater than about 20%.

16. The floorcovering composite of claim 2 wherein the fabric face layer is a woven, knit, tufted, stitched, or interval-bonded textile pile fabric, and joined to the cushion layer with the taller protruding loops facing up away from the adhesive.

17. The tloorcovering composite of claim 2 wherein the fabric face layer is a woven, knit, tufted; stitched, or interval-bonded textile pile fabric, and joined to the cushion layer with the taller protruding loops facing toward the adhesive.

18. The floorcovering composite of claim 1 wherein the face layer fabric is an interval-bonded virtual pile fabric, wherein a warp of yarns is attached to a thermoplastic layer, and the fabric is directly laminated with heat and pressure onto the cushioning layer with the thermoplastic layer acting as the adhesive.

19. The tloorcovering composite of claim 1, wherein the fabric face layer is a warp-knit or stitchbonded fabric formed with one or more inter-engaging tricot bars, forming the two surfaces of the fabric face layer.

20. The floorcovering composite of claim 19, wherein underlaps of the fabric face layer are placed against the adhesive.

21. The floorcovering composite of claim 19 wherein overlaps of the fabric face layer are placed against the adhesive layer.

22. The floorcovering composite of claim 1 further comprising a barrier layer.

23. The floorcovering composite of claim herein the barrier layer comprises a gas permeable, liquid impermeable material.

24. The floorcovering composite of claim 22, wherein the fabric face layer is treated with a repellent polymeric coating.

25. The floorcovering composite of claim 2, wherein the entire composite is treated with a repellent polymeric coating.

* * * * *